(12) United States Patent
Sato

(10) Patent No.: US 11,188,788 B2
(45) Date of Patent: Nov. 30, 2021

(54) SYSTEM AND METHOD TO DETERMINE A TIMING UPDATE FOR AN IMAGE RECOGNITION MODEL

(71) Applicant: CANON KABUSHIKI KAISHA, Tokyo (JP)

(72) Inventor: Shunsuke Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 16/570,877

(22) Filed: Sep. 13, 2019

(65) Prior Publication Data

US 2020/0089994 A1    Mar. 19, 2020

(30) Foreign Application Priority Data

Sep. 19, 2018 (JP) .............................. JP2018-174814

(51) Int. Cl.
*G06K 9/62* (2006.01)
*G06K 9/00* (2006.01)

(52) U.S. Cl.
CPC ....... *G06K 9/6254* (2013.01); *G06K 9/00671* (2013.01); *G06K 9/00744* (2013.01); *G06K 9/6232* (2013.01); *G06K 9/6256* (2013.01); *G06K 9/6263* (2013.01); *G06K 9/00771* (2013.01)

(58) Field of Classification Search
CPC ......................................... G06K 9/62–9/6287
See application file for complete search history.

(56) References Cited

U.S. PATENT DOCUMENTS

| 10,115,185 B2* | 10/2018 | Gibbon ............... G06K 9/6255 |
| 2010/0205120 A1* | 8/2010 | Zou ...................... G06K 9/6253 |
| | | 706/12 |
| 2018/0121732 A1* | 5/2018 | Kim .................... G06K 9/6262 |
| 2020/0143149 A1* | 5/2020 | Han ................... G06K 9/00268 |

FOREIGN PATENT DOCUMENTS

| JP | 2012221437 A | 11/2012 |
| JP | 2016015116 A | 1/2016 |
| JP | 2017117024 A | 6/2017 |

* cited by examiner

*Primary Examiner* — Brian Werner
(74) *Attorney, Agent, or Firm* — Canon U.S.A., Inc. IP Division

(57) ABSTRACT

An information processing system includes: a recognition unit configured to perform recognition processing on a video captured by an image capturing unit; a determination unit configured to determine timing to update a model used for the recognition processing; and an update unit configured to update the model at the determined timing.

18 Claims, 16 Drawing Sheets

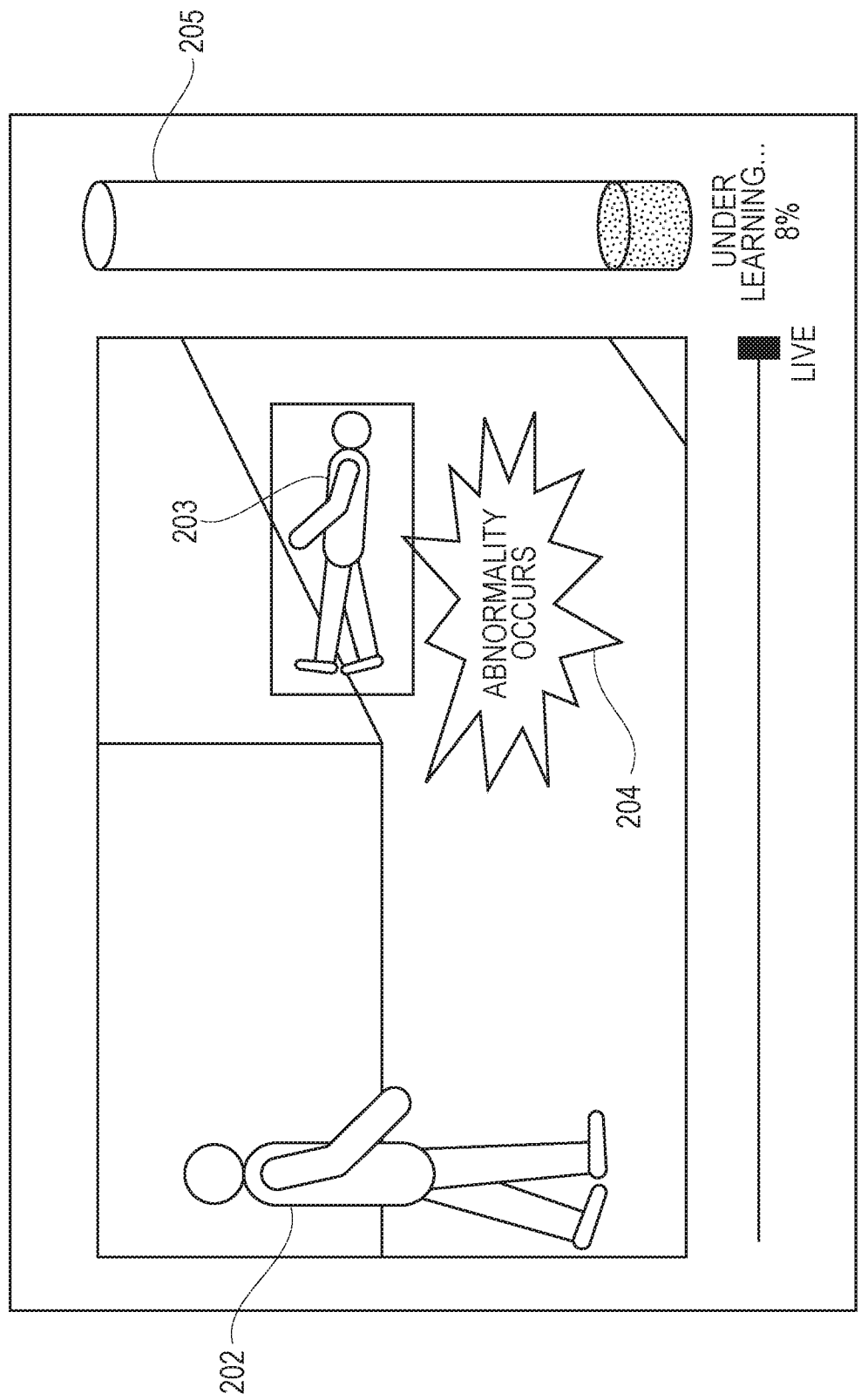

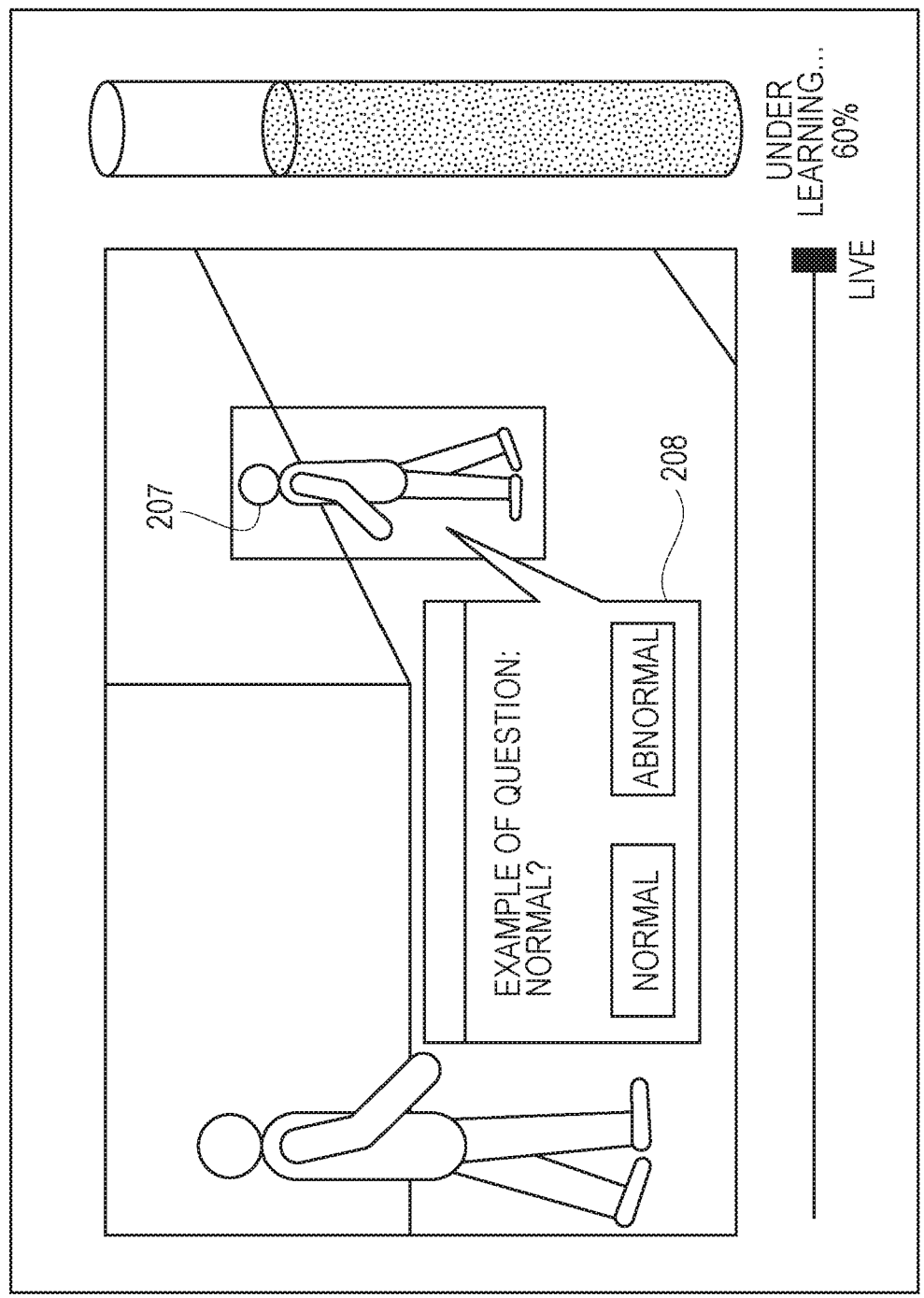

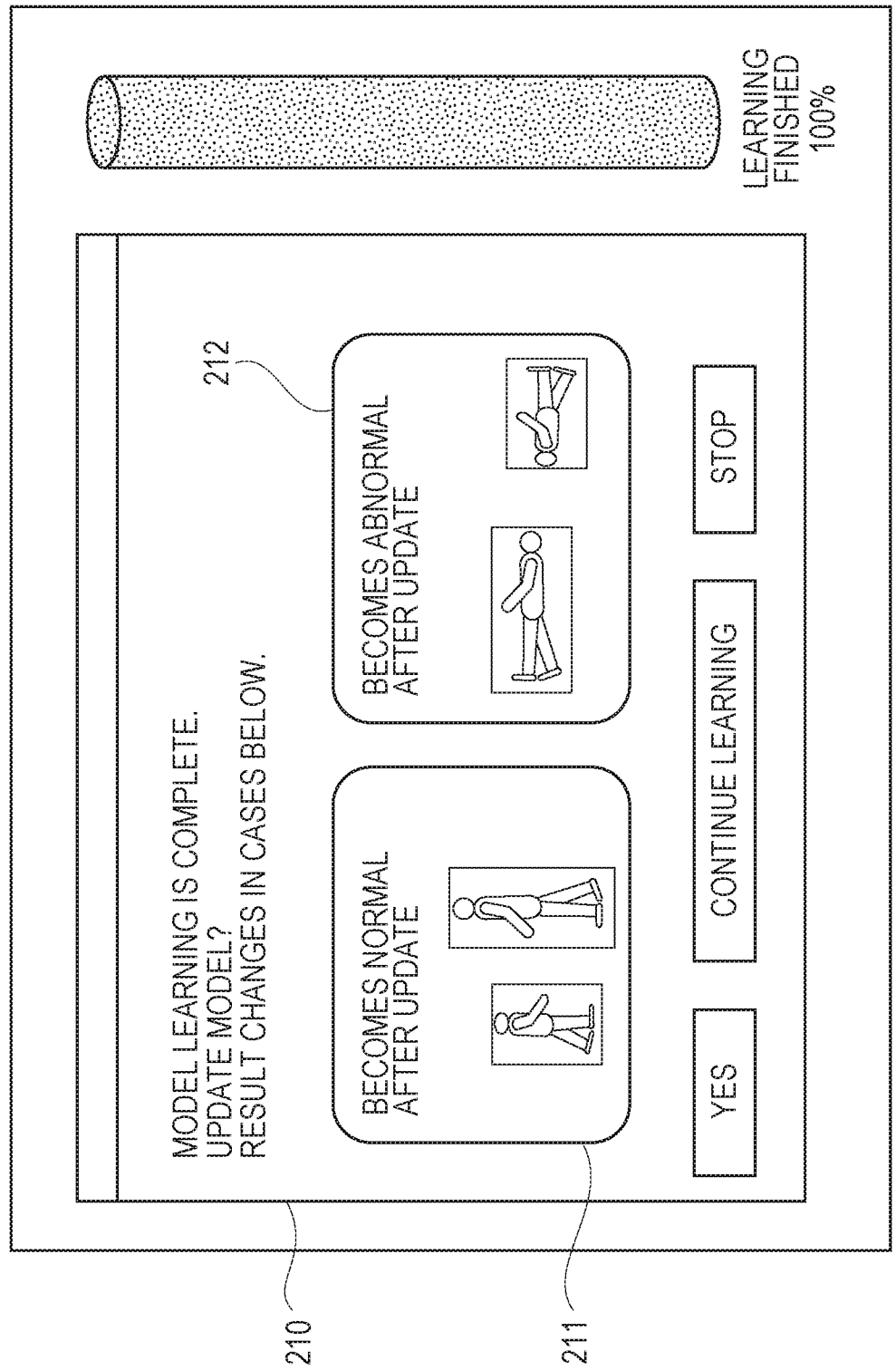

FIG. 9A  FIG. 9B  FIG. 9C
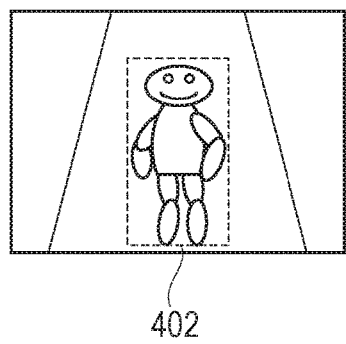
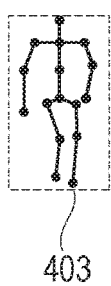
| PARIETAL | (0.56, 0.00) |
| --- | --- |
| NECK | (0.54, 0.30) |
| RIGHT SHOULDER | (0.26, 0.31) |
| ⋮ | |
| LEFT ANKLE | (0.39, 2.07) |
FIG. 9D
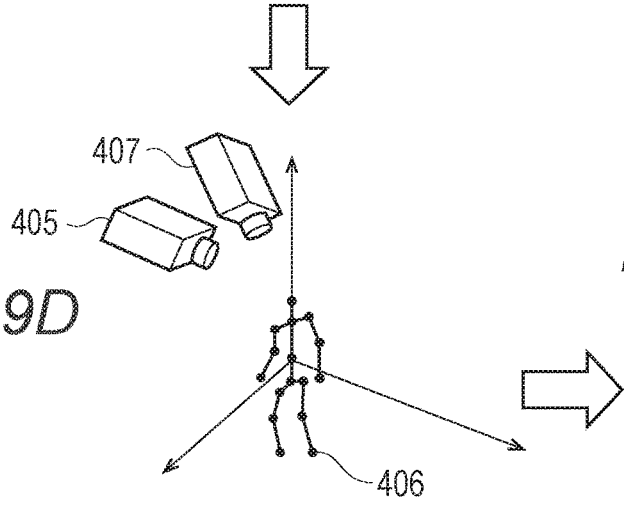
FIG. 9E

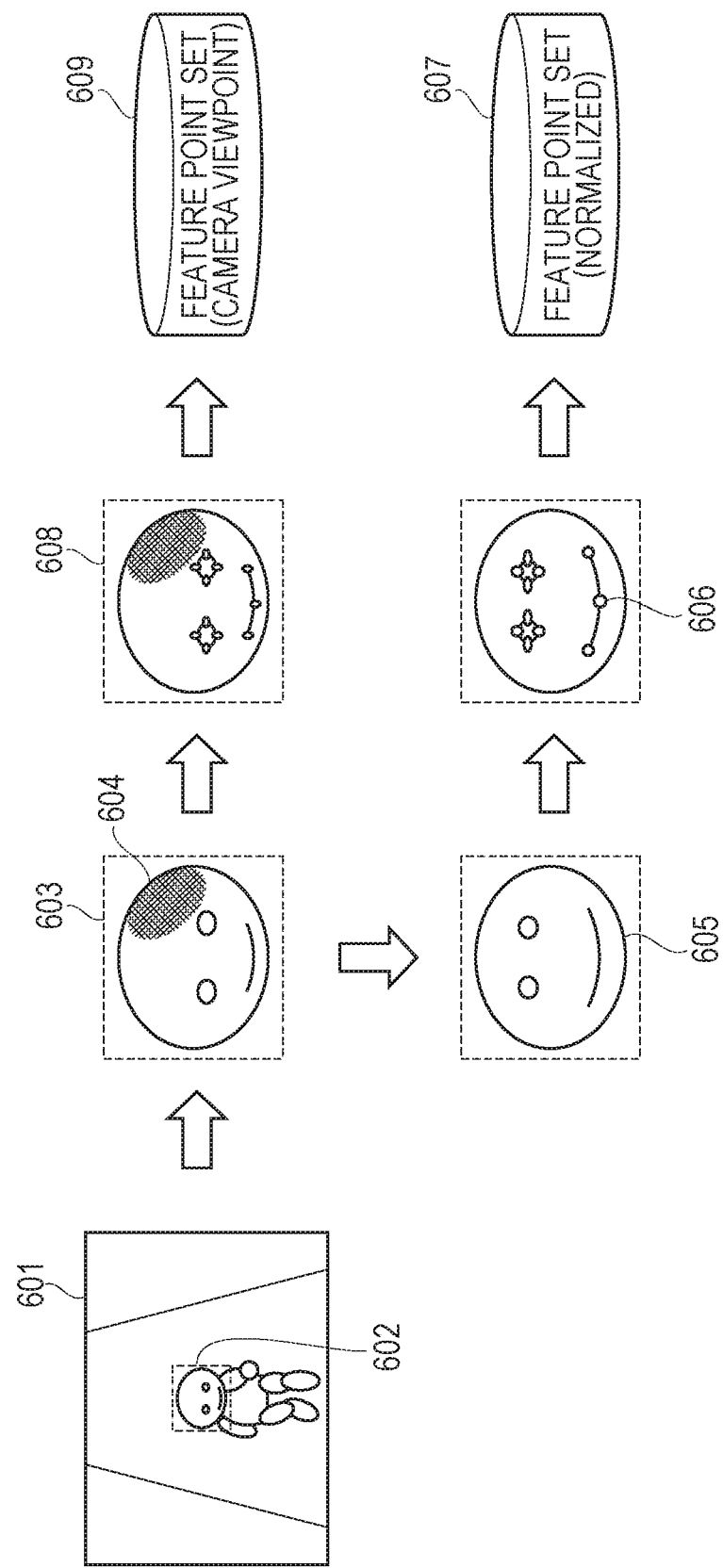

SYSTEM AND METHOD TO DETERMINE A TIMING UPDATE FOR AN IMAGE RECOGNITION MODEL

BACKGROUND

Field

The present invention relates to an information processing system, an information processing method, and a storage medium.

Description of the Related Art

When surveillance cameras installed in various environments recognize videos, in order to improve recognition accuracy in each camera-specific installation environment, methods of adapting to a domain are known.

For example, Japanese Patent Laid-Open No. 2016-15116 proposes a method of holding an installation environment of a camera and parameters used for recognition as a database, and with a new camera, performing recognition using recognition parameters of another camera that is similar in environment.

Japanese Patent Laid-Open No. 2017-117024 proposes a method of switching detection models prepared in advance based on an amount of face rotation, shadow, or a state of an ornament.

Japanese Patent Laid-Open No. 2012-221437 proposes a method of converting a video captured by a camera as viewed from the front, and using the normalized video for recognition.

However, even if the method of Japanese Patent Laid-Open No. 2016-15116 is used, there is not always a camera of an environment similar to a domain to adapt. As in the method of Japanese Patent Laid-Open No. 2017-117024, even if models in various domains are prepared in advance, there is a limit to adapt to various environments.

If a model of a similar domain cannot be prepared, like the method of Japanese Patent Laid-Open No. 2012-221437, it is possible to perform conversion such as normalization on a recognition object video and a feature amount and to use the recognition parameters created in another domain. However, an extra conversion calculation load is imposed, and mixture of an error cannot be avoided because of estimation from a video, which can be a factor to lower recognition accuracy.

Therefore, it is preferable to be able to perform recognition using a model learned in a domain of a camera to adapt. However, when performing re-learning, it is necessary to collect learning data in an environment of the camera, causing a problem that recognition cannot be performed until the collection is complete.

SUMMARY

According to one aspect of the present invention, an information processing system includes: a recognition unit configured to perform recognition processing on a video captured by an image capturing unit; a determination unit configured to determine timing to update a model used for the recognition processing; and an update unit configured to update the model at the timing.

Further features will become apparent from the following description of exemplary embodiments (with reference to the attached drawings).

BRIEF DESCRIPTION OF THE DRAWINGS

FIGS. 7A to 7C are views for describing an example of an operation of a display unit and a manipulation of a user.

FIGS. 9A to 9E are diagrams for describing a feature amount and a feature amount conversion method performed by a feature amount conversion unit.

FIG. 11 is a diagram for describing image conversion performed in a second embodiment and a feature amount.

DESCRIPTION OF THE EMBODIMENTS

Embodiments of the present invention will be described below with reference to the drawings.

First Embodiment

Figure 1:
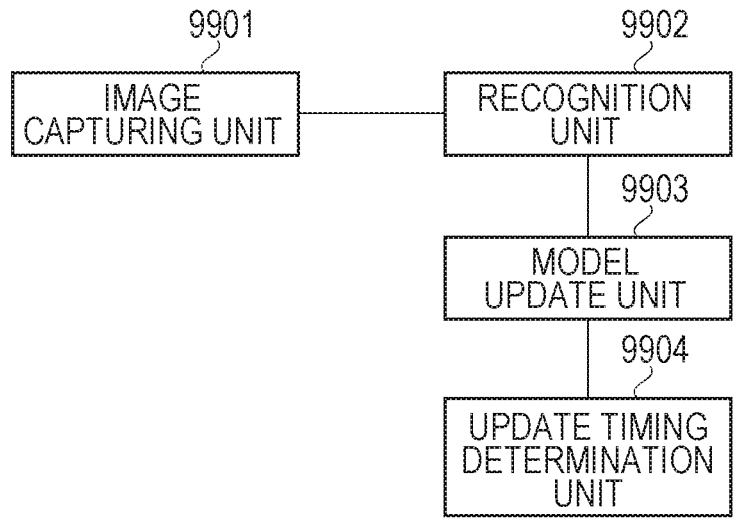
FIG. 1 is a diagram showing an outline of a functional configuration of an information processing system.

FIG. 1 is a diagram showing an outline of a functional configuration of an information processing system.

An image capturing unit 9901 captures a video. The image capturing unit 9901 is embodied by an image capturing unit 101 described later.

A recognition unit 9902 performs recognition processing on the video captured by the image capturing unit 9901. The recognition unit 9902 uses a model for the recognition processing. The recognition unit 9902 is embodied by a recognition unit 103 described later.

A model update unit 9903 updates the model used by the recognition unit 9902. The model update unit 9903 is embodied by a model update unit 111 described later.

An update timing determination unit 9904 determines timing at which the model update unit 9903 updates the model. The update timing determination unit 9904 is embodied by an update timing determination unit 112 described later.

Figure 2:
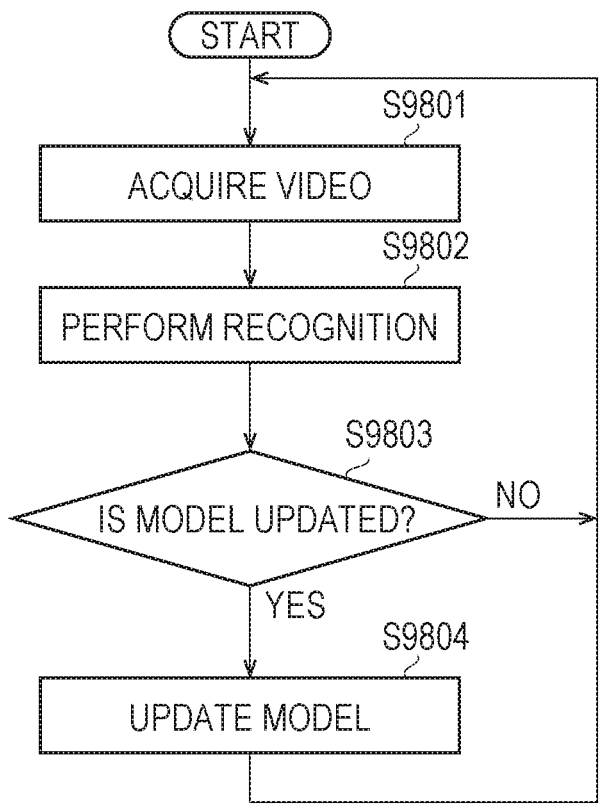
FIG. 2 is a flowchart showing an outline of information processing of the information processing system.

FIG. 2 is a flowchart showing an outline of information processing of the information processing system.

In step S9801, the image capturing unit 9901 captures a video and acquired the video. Step S9801 is embodied in step S306 described later.

Next, in step S9802, the recognition unit 9902 performs recognition processing on the video acquired in step S9801. Step S9802 is embodied in step S311 described later.

Next, in step S9803, the update timing determination unit 9904 determines whether it is timing at which the model update unit 9903 updates the model. On determination that it is not timing to update the model, the update timing determination unit 9904 returns to step S9801. On determination that it is timing to update the model, the update timing determination unit 9904 proceeds to step S9804. Step S9803 is embodied in step S322 described later.

In step S9804, the model update unit 9903 updates the model the recognition unit 9902 uses for the recognition processing. Step S9804 is embodied in step S323 described later. After step S9804, the model update unit 9903 returns to step S201.

Figure 3:
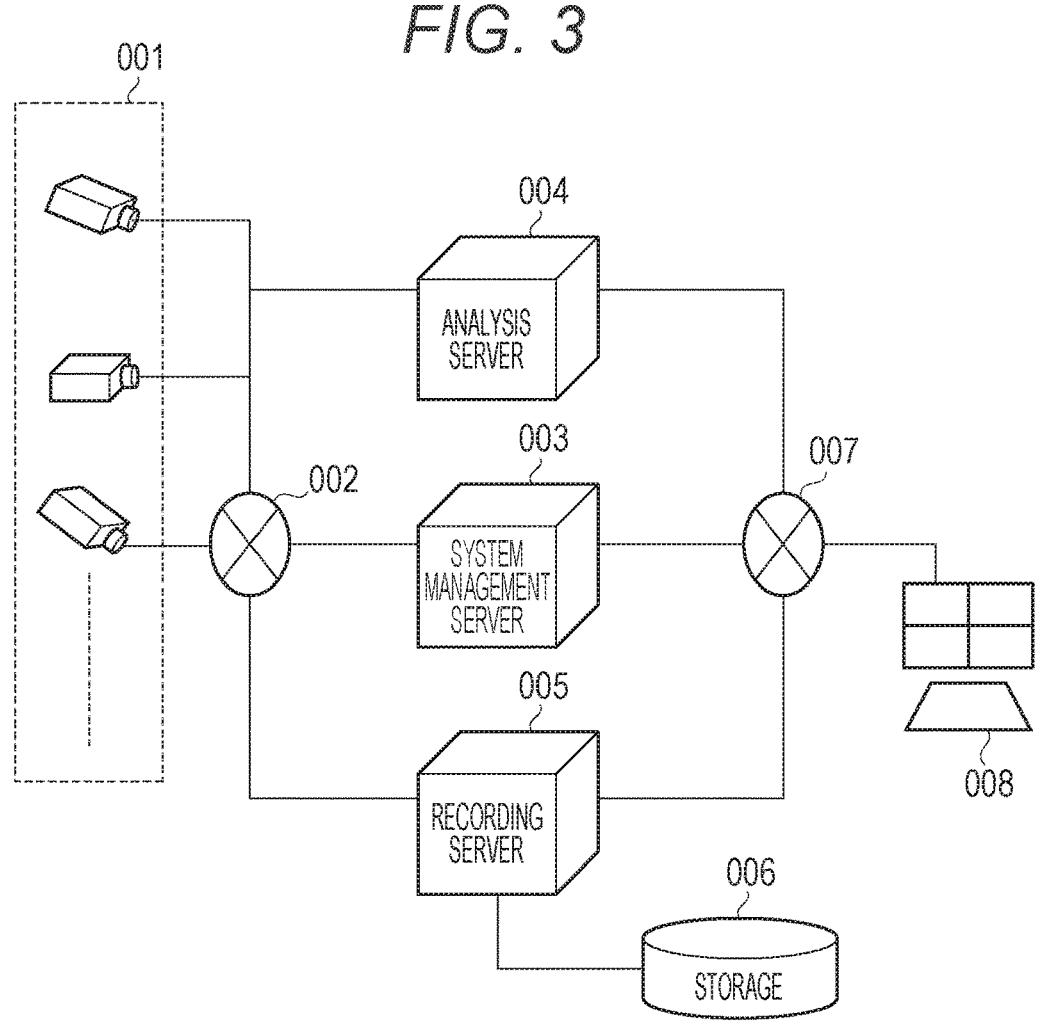
FIG. 3 is a diagram showing one example of a system configuration of the information processing system.

FIG. 3 is a diagram showing one example of a system configuration of the information processing system.

Each surveillance camera of a surveillance camera group 001 is installed at a place to perform surveillance and transmits a video. Each surveillance camera is installed at an appropriate height and angle in order to obtain an optimal angle of view for surveillance.

Each surveillance camera and a system management server 003, an analysis server 004, and a recording server 005 are connected via a camera network 002. The camera network 002 is configured by, for example, a local area network (LAN). The camera network 002 is configured such that the system management server 003, the analysis server 004, and the recording server 005 can obtain the video of each surveillance camera.

The system management server 003, the analysis server 004, and the recording server 005 are communicably connected to one another via a client network 007 different from the camera network 002. The client network 007 is configured, for example, by a LAN, and the user connects a terminal device 008 to the client network 007. The terminal device 008 is a calculator having a display, requests the video of the designated surveillance camera to the system management server 003, acquires the video via the system management server 003 for browsing, and performs surveillance. Also, the terminal device 008 browses a past video recorded in the recording server 005, browses an analysis result of the analysis server 004 together, and receives notification.

The system management server 003 is a calculator on which video management system (VMS) software runs, holds settings of each surveillance camera, the analysis server 004, and the recording server 005, and manages operations.

The analysis server 004 is a calculator, and analyzes the video transmitted from each surveillance camera or the video recorded in the recording server 005 in accordance with the setting by the system management server 003. The analysis server 004 performs recognition processing such as, for example, face authentication, human figure tracking, measurement of stream of people, intrusion detection, human figure attribute detection, weather detection, or congestion detection, in accordance with an installation place of each surveillance camera. The analysis server 004 then compiles results and notifies the user in accordance with the settings. The first embodiment describes a method of recognizing a human figure who has taken an abnormal action in the video.

In accordance with the settings made by the system management server 003, the recording server 005 records the video obtained from each surveillance camera in the storage 006. The recording server 005 then transmits the recorded video in response to a request from the system management server 003, the analysis server 004, the terminal device 008, or the like. Also, the recording server 005 stores metadata or the like indicating an analysis result made by the analysis server 004.

The storage 006 includes a recording medium such as a hard disk, and a micro processing unit (MPU) or the like. Instead of the recording medium, network attached storage (NAS), a storage area network (SAN), or storage on a network such as cloud service may be used.

In the first embodiment, the surveillance camera group 001, the system management server 003, the analysis server 004, the recording server 005, and the terminal device 008 are different computer devices, but are not limited thereto. For example, the system management server 003, the analysis server 004, and the recording server 005 may be implemented as an application in one server apparatus or as a virtual server. Alternatively, the function of the terminal device 008 may be provided in the system management server 003 or the analysis server 004. Alternatively, functions of the analysis server 004 and the recording server 005 may be mounted in each surveillance camera (camera device) of the surveillance camera group 001.

Figure 4:
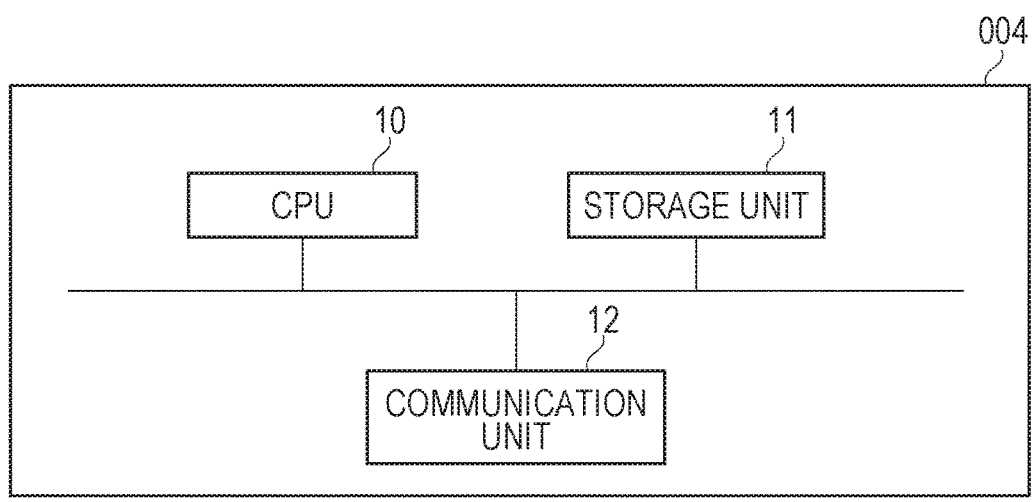
FIG. 4 is a diagram showing one example of a hardware configuration of an analysis server.

FIG. 4 is a diagram showing one example of a hardware configuration of the analysis server 004.

The analysis server 004 includes a central processing unit (CPU) 10, a storage unit 11, and a communication unit 12 as the hardware configuration.

The CPU 10 controls the entire analysis server 004. The storage unit 11 includes a memory, a recording medium such as a hard disk, or the like, and stores a program, an image, or the like. Instead of the recording medium, the analysis server 004 may use storage on the network such as an NAS or SAN as the storage unit 11. The communication unit 12 connects the analysis server 004 to the network or the like, and controls communication with other devices. The CPU 10 performs processing according to the program recorded in the storage unit 11, thereby implementing the functional configuration of the analysis server 004 shown in FIGS. 5, 6, and 12 described later, and the information processing regarding the analysis server 004 of flowcharts of FIGS. 8, 13, 14, and 16. As another example, at least part of the function of the analysis server 004 may be implemented by, for example, cooperation among a plurality of CPUs and storage units. As another example, at least part of the function of the analysis server 004 may be implemented using a hardware circuit. As another example, the function of the analysis server 004 may be implemented by cooperation among a plurality of devices.

The hardware configurations of the system management server 003 and the recording server 005 are also similar to the hardware configuration of the analysis server 004. The CPU of each server performs processing according to the program stored in the storage unit of each server, thereby implementing the functional configuration of each server shown in FIGS. 5, 6, and 12 described later, and the information processing regarding each server of the flowcharts of FIGS. 8, 13, 14, and 16.

Meanwhile, the hardware configuration of the terminal device 008 has the hardware configuration similar to the hardware configuration of the analysis server 004, and further includes a display unit and an input unit. The display unit includes a liquid crystal display or the like, and displays processing results by the CPU of the terminal device 008, data received from other servers, or the like. The input unit includes a switch, a touch panel, or the like, senses a manipulation made by the user, and inputs manipulation information. Instead of the touch panel, another pointing device such as a mouse or a trackball may be used. The CPU of the terminal device 008 performs processing according to the program stored in the storage unit of the terminal device 008, thereby implementing the functional configuration of the terminal device 008 shown in FIGS. 5, 6, and 12 described later.

Figure 5:
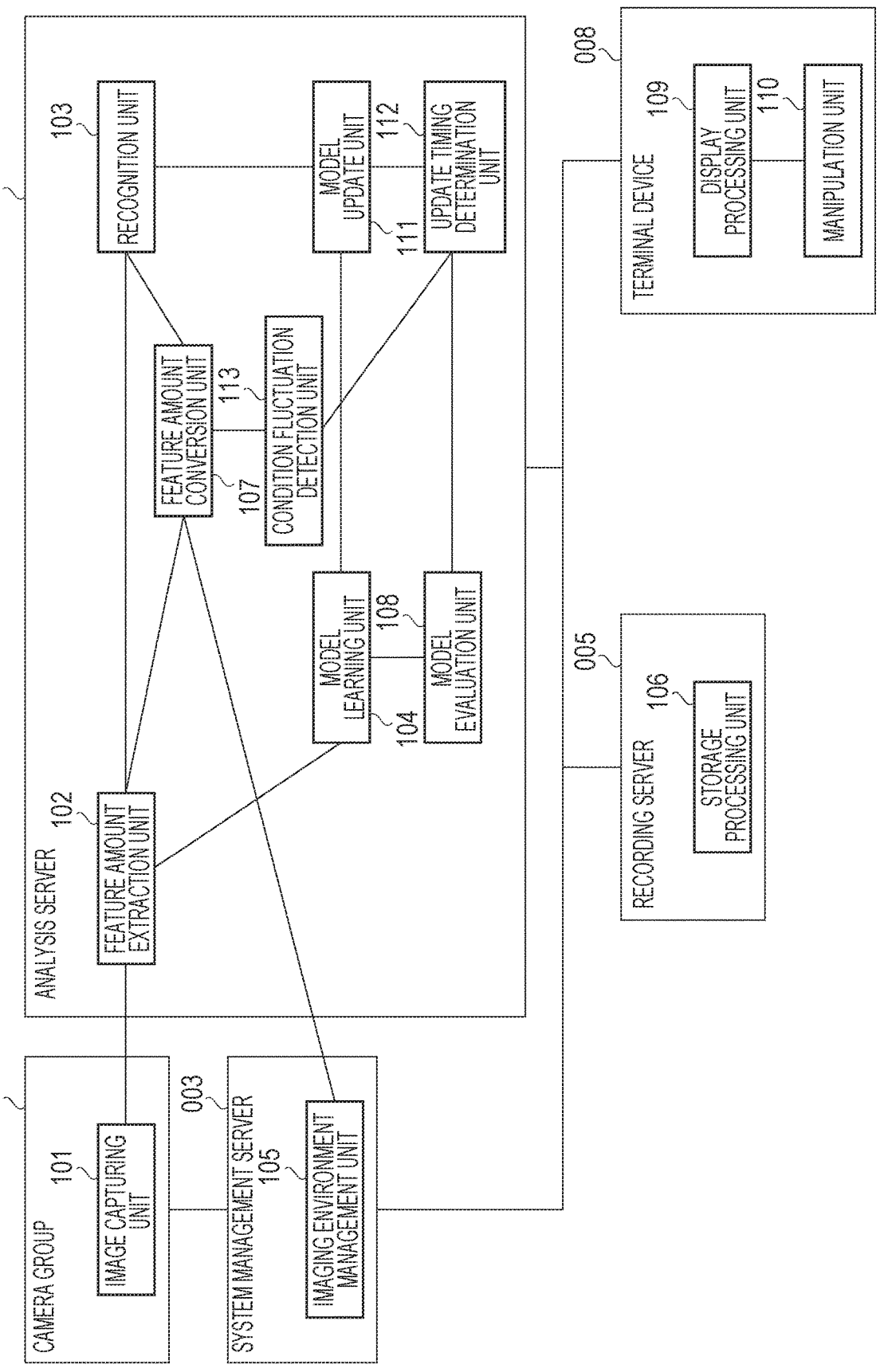
FIG. 5 is a diagram showing one example of the functional configuration of the information processing system of a first embodiment.

FIG. 5 is a diagram showing one example of the functional configuration of the information processing system of the first embodiment.

The information processing system includes, as the functional configuration, the image capturing unit 101, a feature amount extraction unit 102, the recognition unit 103, a model learning unit 104, an imaging environment management unit 105, a storage processing unit 106, a feature amount conversion unit 107, a model evaluation unit 108, a display processing unit 109, a manipulation unit 110, the model update unit 111, the update timing determination unit 112, and a condition fluctuation detection unit 113.

The image capturing unit 101 corresponds to the surveillance camera group 001 shown in FIG. 3. The surveillance camera included in the image capturing unit 101 is a surveillance camera including an imaging device and lens, a motor that drives the imaging device and lens, and an MPU that controls the imaging device and lens. The surveillance camera captures a moving image and converts the moving image into electronic data. A plurality of the surveillance cameras of the image capturing unit 101 is installed and connected by a network such as a LAN, for example.

The feature amount extraction unit 102, the recognition unit 103, the model learning unit 104, the feature amount conversion unit 107, the model evaluation unit 108, the model update unit 111, the update timing determination unit 112, and the condition fluctuation detection unit 113 are included in the analysis server 004.

The feature amount extraction unit 102 extracts the feature amount from the video captured by the image capturing unit 101.

The recognition unit 103 holds a statistical model, and recognizes an object included in the video by applying the statistical model to the feature amount extracted by the feature amount extraction unit 102.

The model learning unit 104 performs learning by using the feature amount extracted by the feature amount extraction unit 102 as teaching data to create a new model.

The feature amount conversion unit 107 converts the feature amount extracted by the feature amount extraction unit 102 into a new feature amount. The feature amount conversion unit 107 determines a method of converting the feature amount based on fluctuation of a condition accompanying the capturing detected by the condition fluctuation detection unit 113.

The model evaluation unit 108 evaluates performance of the designated model. For the designated model, the model evaluation unit 108 compiles results of recognition by the recognition unit 103 on test data held in advance in the storage processing unit 106, calculates and outputs precision as recognition accuracy. However, a method of evaluation is not limited to this method, and other criteria such as a recall ration or F value may be used, or test data may be dynamically created during operation.

In the first embodiment, the Gaussian mixture distribution model is used as the model, and a value obtained by substituting a value of the feature amount into a distribution function is a recognition score. The model evaluation unit 108 calculates the recognition score S (x; M) of the feature amount x when the model M is used by the following equation.

$$S(x; M) = \sum_{i \in 1 \ldots K} \omega_i N(x; \mu_i, \sigma_i)$$

Here, K is the mixed number. N (x; μ, σ) is a value for x at the average μ, multivariate Gaussian distribution (normal distribution) of the variance-covariance matrix σ, ωi, μi and σi are a weight, an average, and variance-covariance matrix of the i-th distribution of the model M, respectively. The weight is a positive real number, and the sum of ω1 to ωK is 1. A value range of the recognition score is a real number in the range of [0, 1], and indicates normal as the value is closer to 1 and indicates abnormal as the value is closer to 0.

However, the model is not limited to this model, and may be, for example, a neural network or a nearest neighbor model.

The model update unit 111 updates the statistical model held by the recognition unit 103 in accordance with the update timing determination unit 112.

The update timing determination unit 112 determines timing at which the model update unit 111 updates the model.

The condition fluctuation detection unit 113 determines whether the conditions involved in the capturing are fluctuating for the two surveillance cameras included in the image capturing unit 101 or the surveillance cameras at different time.

The imaging environment management unit 105 is included in the system management server 003 shown in FIG. 3.

The imaging environment management unit 105 manages an imaging environment determined by an installation state of each surveillance camera of the image capturing unit 101. The imaging environment in the first embodiment includes a pan/tilt/zoom (PTZ) angle and an installation height of the surveillance camera. Also, the imaging environment management unit 105 links the statistical model for use by the recognition unit 103 in each surveillance camera to each surveillance camera, and holds the statistical model. The imaging environment management unit 105 then transmits imaging environment information in response to a request for acquisition of the imaging environment from the recognition unit 103 or the like.

The storage processing unit 106 is included in the recording server 005 shown in FIG. 3.

The storage processing unit 106 stores, in the storage 006, information such as the video captured by the image capturing unit 101, the feature amount extracted by the feature amount extraction unit 102, information resulting from recognition by the recognition unit 103, the model created by the model learning unit 104, the imaging environment managed by the imaging environment management unit 105, and the model. Also, the storage processing unit 106 stores information representing these relationships and metadata such as creation time in the storage 006.

The display processing unit 109 and the manipulation unit 110 are included in the terminal device 008 shown in FIG. 3.

The display processing unit 109 presents information to the user and creates a user interface (UI) screen for performing manipulations to display the screen on the display unit.

The manipulation unit 110 senses the manipulation by the user via the input unit and inputs the manipulation into the information processing system.

The first embodiment makes a description using a device that recognizes abnormal behavior from the video, but the recognition object is not limited thereto. For example, a specified human figure or vehicle type may be detected from the video, or an event or time period may be recognized. Also, the recognition object may be voice and/or a document instead of the video.

Figure 6:
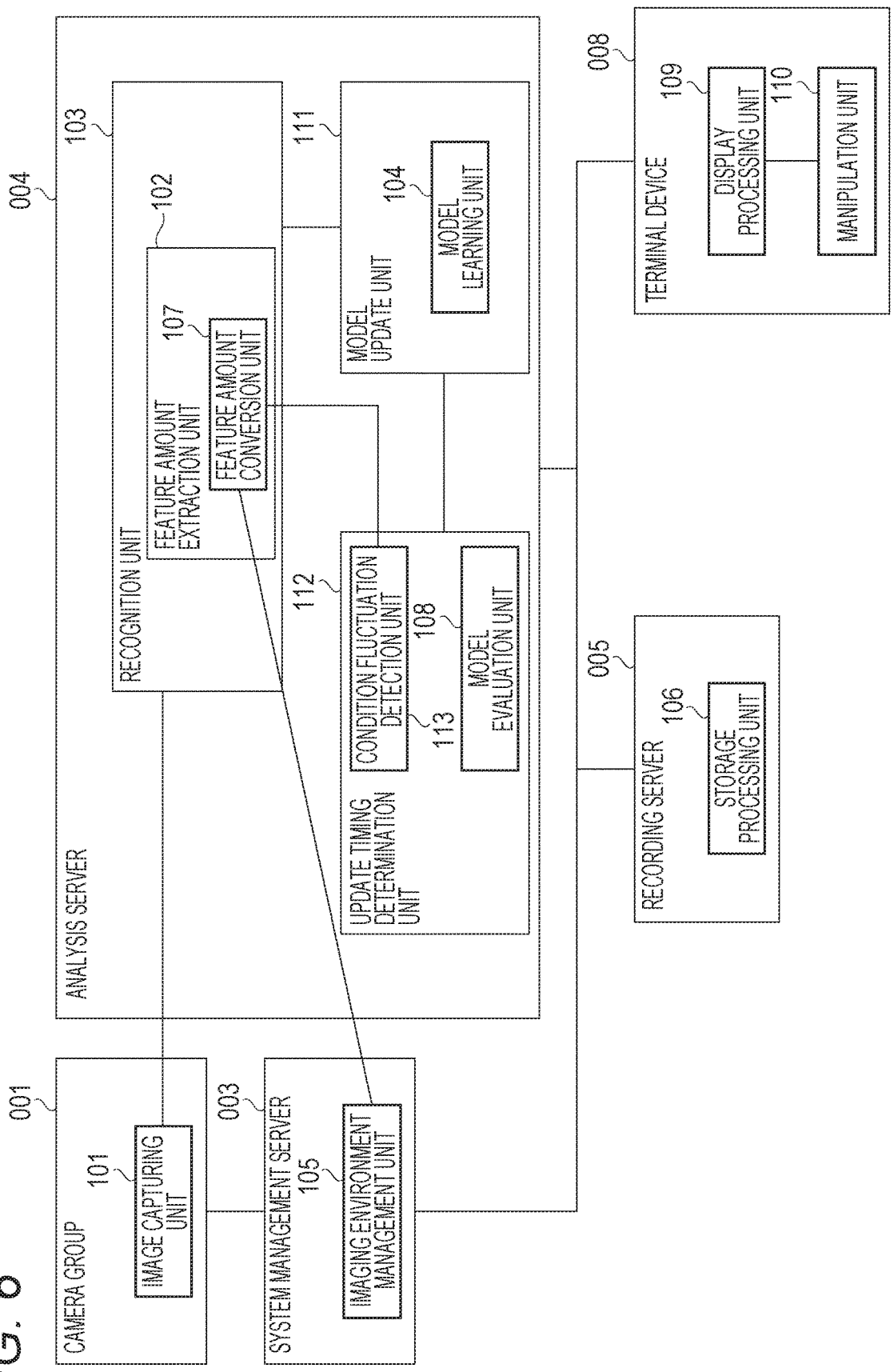
FIG. 6 is a diagram showing another example of the functional configuration of the information processing system of the first embodiment.

The functional configurations described in FIG. 5 may not be provided independently of one another. FIG. 6 is a diagram showing another example of the functional configuration of the information processing system of the first embodiment. In the example of FIG. 6, the recognition unit 103 includes the function of the feature amount extraction unit 102. The feature amount extraction unit 102 includes the function of the feature amount conversion unit 107. The model update unit 111 includes the function of the model learning unit 104. The update timing determination unit 112 includes the condition fluctuation detection unit 113 and the model evaluation unit 108. The relationship of the functional configurations is not limited to the inclusion relationship shown in FIGS. 5 and 6. For example, only the feature amount conversion unit 107 may be independent of FIG. 6, or the feature amount conversion unit 107 may be directly included in the recognition unit 103. Alternatively, the update timing determination unit 112 may include not both of but only one of the condition fluctuation detection unit 113 and the model evaluation unit 108.

Next, with reference to FIGS. 7A to 7C, an example of the operation of the display unit and the manipulation of the user in the first embodiment will be described.

FIGS. 7A, 7B and 7C are schematic views each showing an example in which the display processing unit 109 displays the video captured by the image capturing unit 101 on the display unit. The image capturing unit 101 is installed as a surveillance camera in a surveillance object place, and a live video is displayed on the display unit. The user looks at the video and performs surveillance whether an abnormality occurs in the surveillance object place.

FIG. 7A is a view showing one example of a screen display for performing surveillance of a video of a new surveillance camera additionally installed recently. The recognition unit 103 determines whether a human figure appearing in the video such as a human FIG. 202 or 203 is abnormal. If abnormal, the recognition unit 103 notifies the abnormality. Here, since the human FIG. 203 has fallen, an outer frame of the human FIG. 203 and an alarm display 204 are displayed on the display unit.

In this newly installed surveillance camera, the information processing system recognizes the fall by using a statistical model created by a reference camera with another different surveillance camera as the reference. That is, the human FIG. 203 having fallen and the human FIG. 202 having not fallen are a result determined by applying the model created based on a case of the reference camera to a domain of the newly installed surveillance camera.

Meanwhile, the model learning unit 104 learns a new model in the background while operating the surveillance by using human figure data such as the human FIGS. 202 and 203 obtained by the newly installed surveillance camera. A bar graph 205 represents progress of the model learning. As shown in FIG. 7A, if the model learning has not progressed sufficiently, the information processing system prioritizes recognition results in the reference model, and displays only the progress of learning for the new model.

FIG. 7B is a view showing one example of display in a state where learning of the new model by the model learning unit 104 has advanced to a certain extent after FIG. 7A. In order to verify the performance of recognition by the new model at this stage, the information processing system performs recognition by the new model before learning with human data. The information processing system then compares results of the recognition with the recognition result by the reference model. Then, if the recognition results are different, the information processing system requests confirmation from the user. If the human FIG. 207 is recognized as normal by the reference model and as abnormal by the new model, the information processing system displays a confirmation dialog 208 and requests confirmation from the user as to which of the states the human FIG. 207 actually is. This example, in which the human FIG. 207 is actually normal, indicates that learning of the new model is still insufficient. However, the human FIG. 207 may be actually abnormal, indicating that the reference model does not function well in the domain of the newly installed surveillance camera. The confirmation dialog 208 is information on a difference between the recognition result by the new model under learning and the recognition result by the reference model. The input unit inputs, in response to the manipulation of the manipulation unit 110, which of the recognition result by the new model under learning and the recognition result by the reference model is correct.

The information processing system does not display anything if the same recognition result is shown. If the difference between the scores is large, and if the scores are extremely small, the information processing system may request confirmation from the user, or if one of the scores shows an abnormality, the information processing system may request confirmation for all the scores. Alternatively, the information processing system may change behavior in accordance with the progress of learning.

FIG. 7C is a view showing one example of display when the model learning unit 104 completes learning of the new model after FIG. 7B. The display processing unit 109 displays an update confirmation dialog 210 on the display unit, and requests confirmation from the user whether to update the model. Also, the display processing unit 109 presents a human figure video whose recognition result has changed between the reference model and the new model as reference information for the user. A display 211 is a thumbnail display of a human figure whose recognition result changes normally after the model is updated. The display processing unit 109 displays the video of the human figure who is determined to be abnormal by the reference model but is determined to be normal by the new model. Similarly, a display 212 is a thumbnail display of a human figure whose recognition result changes abnormally after the model is updated. The display processing unit 109 displays the video of the human figure who is determined to be normal by the reference model but is determined to be abnormal by the new model. The displays 211 and 212 are information on the difference between the recognition result by the new model with learning completed and the recognition result by the reference model.

The user makes a determination from the presented information. If the user determines to update the model and use the new model thereafter, the user selects "Yes". If the user determines that learning is insufficient and additional learning is necessary, the user selects "continue learning". If the user determines that the update should not be performed, for example, because there are too many errors for some reason, the user selects "stop".

Figure 8:
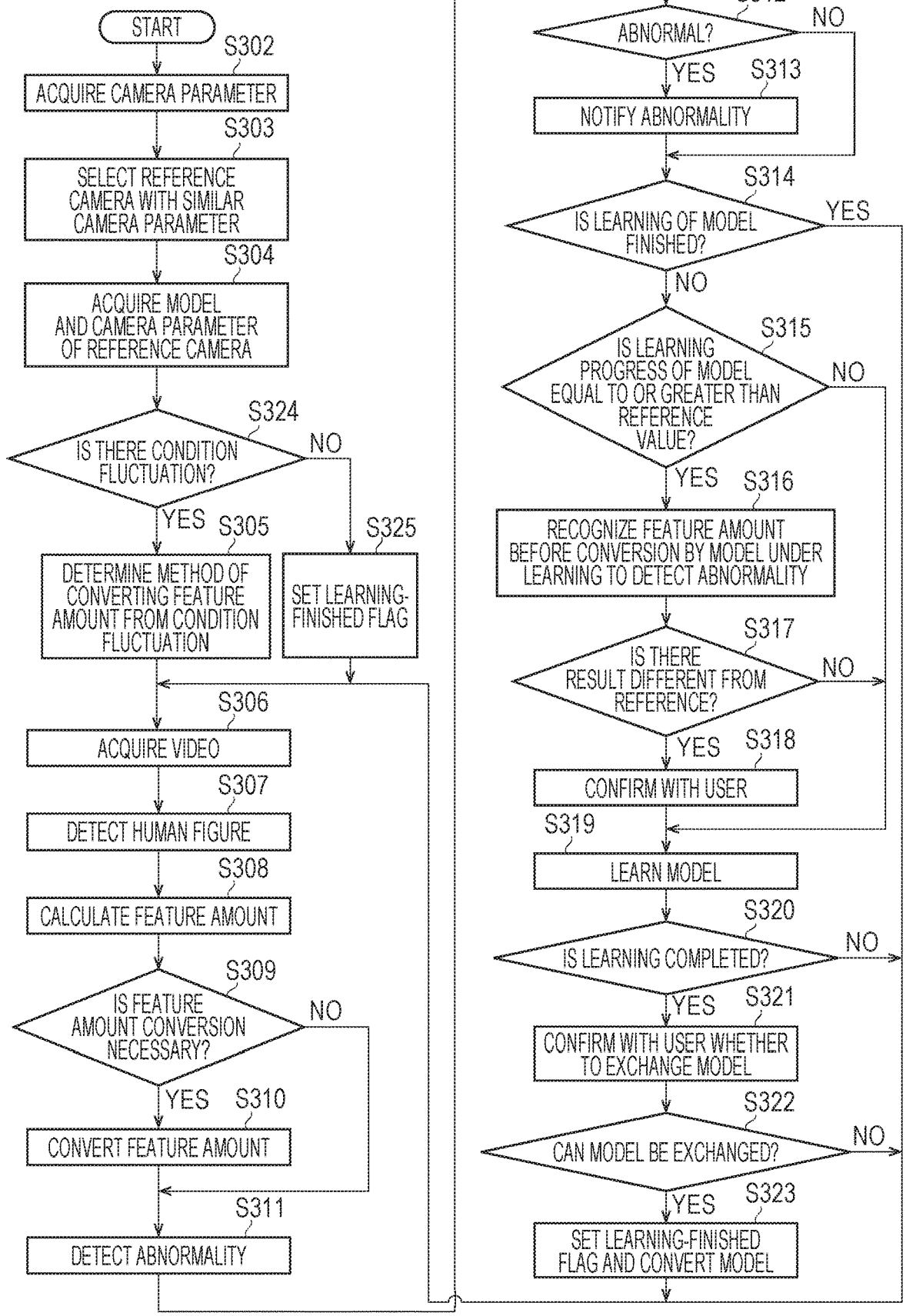
FIG. 8 is a flowchart showing one example of information processing of the first embodiment.

FIG. 8 is a flowchart showing one example of information processing of the first embodiment. The flowchart of FIG. 8 represents processing performed by the information processing system when the newly installed surveillance camera is added, or when the camera environment changes and a reset manipulation is performed. In the following description, it is assumed that the surveillance camera has been newly installed, but the similar procedure can be used when the camera environment changes due to a change in the angle of view or settings of the existing surveillance camera.

The user installs the new surveillance camera that is part of the image capturing unit 101, and registers the newly installed camera with the imaging environment management unit 105.

In step S302, the imaging environment management unit 105 acquires a camera parameter of the newly installed surveillance camera. The camera parameter includes a height of the newly installed surveillance camera and an angle of an imaging direction with respect to the horizontal plane.

In step S303, the imaging environment management unit 105 selects one surveillance camera different from the newly installed surveillance camera as a reference camera.

The imaging environment management unit 105 searches for a surveillance camera of which a learning-finished flag described later has already been set, that is, learning of the model learning unit 104 has been completed. Then, the imaging environment management unit 105 compares camera parameters and selects similar one.

In step S304, the imaging environment management unit 105 acquires the camera parameter and the model of the reference camera. The recognition unit 103 holds the model of the reference camera.

In step S324, the condition fluctuation detection unit 113 compares the camera parameter of the newly installed surveillance camera with the camera parameter of the reference camera to determine whether there is a fluctuation in the capturing condition of the two surveillance cameras. The condition fluctuation detection unit 113 compares the size of the depression angle with respect to the horizontal plane and the installation height of the surveillance camera. If the difference in the size of the depression angle is within 5 degrees and the difference in the height is within 10 cm, the condition fluctuation detection unit 113 determines that the capturing condition is the same and there is no fluctuation. Otherwise, the condition fluctuation detection unit 113 determines that there is a fluctuation in the capturing condition. On determination that there is no fluctuation, the condition fluctuation detection unit 113 proceeds to step S325, and on determination that there is a fluctuation, the condition fluctuation detection unit 113 proceeds to step S305.

The method of determining whether there is a fluctuation in the capturing condition is not limited to the one shown here. For example, the condition fluctuation detection unit 113 may add a comparison of surveillance camera settings such as depth of field or white balance. Alternatively, the condition fluctuation detection unit 113 may compare the background images captured by the respective surveillance cameras, and determine the fluctuation based on the magnitude of the difference.

In step S325, the condition fluctuation detection unit 113 sets the learning-finished flag and proceeds to step S306.

That is, since the fluctuation of the capturing condition is small, the condition fluctuation detection unit 113 determines that the model of the reference camera can be used as it is, and does not perform learning processing in and after step S315 described later.

In step S305, the feature amount conversion unit 107 compares the camera parameter of the newly installed surveillance camera with the camera parameter of the reference camera to determine the method of converting the feature amount.

FIGS. 9A to 9E are diagrams for describing the feature amount used in the first embodiment and the method of converting the feature amount performed by the feature amount conversion unit 107.

FIG. 9A is a schematic view showing one example of a frame image of the video captured by the image capturing unit 101. A vertically long corridor appears, and a human FIG. 402 is walking. The feature amount conversion unit 107 first performs, for example, human figure detection such as Faster-RCNN on this image to detect a rectangle circumscribing the human figure. Then, as shown in FIG. 9B, the feature amount conversion unit 107 estimates, for each detected human figure, joint positions 403 in the image by using, for example, the method described in the following document. The feature amount conversion unit 107 detects 16 points: the parietal, neck, right shoulder, right elbow, right wrist, left shoulder, left elbow, left wrist, body center, waist center, right hip joint, right knee, right ankle, left hip joint, left knee, and left ankle (the parietal is also referred to as a joint for convenience). Joints to detect are not limited to the joints mentioned here, but joints of fingers and vertebrae of spine may be detected, or conversely, for example, the elbow and the knee may be omitted for simplification. The following document is hereby incorporated by reference herein in its entirety.

Wei, Shih-En, et al. "Convolutional pose machines". Proceedings of the IEEE Conference on Computer Vision and Pattern Recognition. 2016.

Each joint is a point inside the rectangle in which the human figure is detected as shown in FIG. 9C, and is expressed by coordinates with the upper left being (0, 0) and the length of the horizontal side being 1. The reason for normalizing the horizontal length to 1 is to absorb the size of the human figure at the time of capturing, but if size information is considered important, normalization may not be performed. A 32-dimensional real vector in which these coordinate values are arranged in order is defined as the feature amount in the first embodiment.

The conversion of the feature amount is defined as follows. As shown in FIGS. 9B and 9D, the feature amount conversion unit 107 estimates the positional relationship between the surveillance camera and the human figure on a 3D space from the joint positions 403 on the source image and the imaging environment 405 of the surveillance camera by the method described later. Then, the feature amount conversion unit 107 estimates the joint positions 406 on a 3D space by using the method described in the following document or the like. Next, as shown in FIG. 9E, when the joint positions 406 on a 3D space are virtually captured from a conversion destination imaging environment 407, the feature amount conversion unit 107 obtains two-dimensional positions 408 where the joint positions are projected. Then, the feature amount conversion unit 107 creates the feature amount from the joint positions of the two-dimensional positions 408. The feature amount can be created by the feature amount conversion unit 107 calculating a rotation matrix and translation vector on a 3D space that move from the imaging environment 405 to the imaging environment 407, and applying reverse rotation and translation to the 3D coordinates of each joint in the joint positions 406. The feature amount conversion unit 107 calculates and holds an inverse matrix of the rotation matrix and the translation vector from the camera parameter of the newly installed surveillance camera and the camera parameter of the reference camera for conversion usage. On determination that the imaging environment is very close, the information processing system may use the model of the reference camera as it is, without performing any conversion and without performing further learning. The following document is hereby incorporated by reference herein in its entirety.

Martinez, Julieta, et al. "A simple yet effective baseline for 3d human pose estimation". arXiv preprint arXiv: 1705.03098 (2017).

Figure 10A:
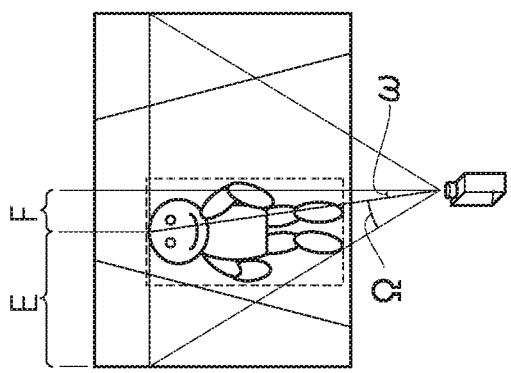
FIGS. 10A to 10C are diagrams for describing a method of estimating a positional relationship on a 3D space.
Figure 10C:
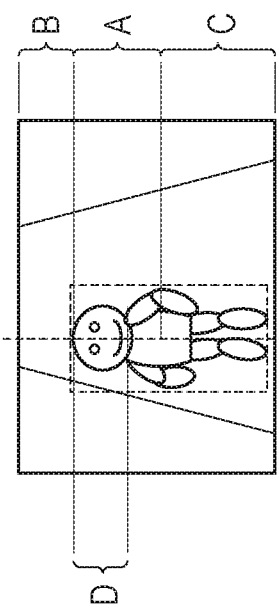
Figure 10B:
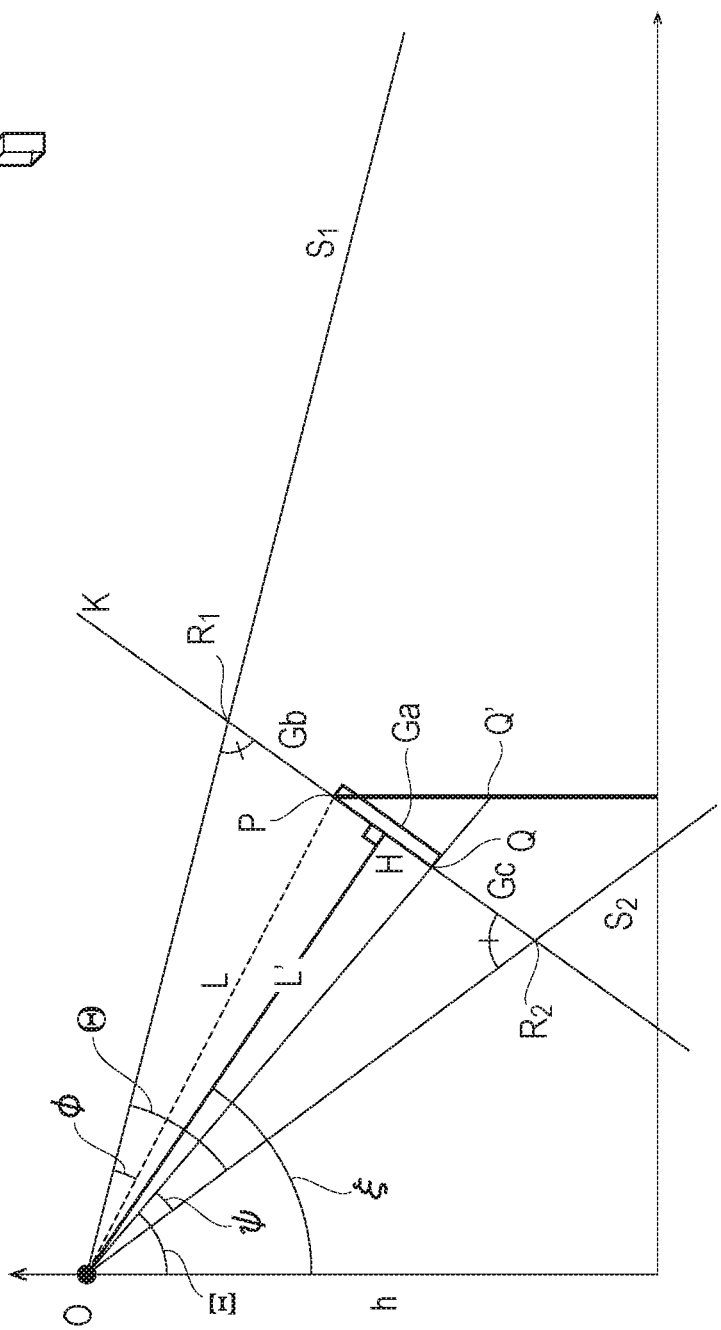

With reference to FIGS. 10A to 10C, details of the method of estimating a positional relationship between the surveillance camera and the human figure on a 3D space, which are performed to obtain an attitude feature, will be described. However, this is one example and does not prevent the use of other calculation methods.

FIG. 10A is a 2D video captured by the image capturing unit 101. The feature amount conversion unit 107 chooses two joints, and estimates a distance and angle of each joint with respect to the surveillance camera and a length between the two joints. This is used to estimate joint positions on a 3D space. Here, the parietal and the body center are used. This is because, as will be described later, the distance to the surveillance camera is estimated using the head, and in the positional relationship between the head and the body, a change in a relative position is smaller than in the hands and feet.

The feature amount conversion unit 107 estimates the vertical direction of the 2D video. The feature amount conversion unit 107 measures, in the 2D video, a size D of the head, a length A in the height direction between the parietal and the body center, a length B in the height direction from the parietal to the upper end of the screen, and a length C in the height direction from the body center to the bottom end of the screen.

Next, from the size D of the head, the feature amount conversion unit 107 obtains a distance L from the head to the surveillance camera. Since the head is relatively spherical and an individual difference is relatively smaller than a height and lengths of the arms and legs, it is considered that the heads with the same size are at approximately the same distance regardless of the angle. The information processing system can create a conversion table from the head size D to the distance L by placing the head with a standard size or its mock-up at various camera distances in advance and capturing 2D videos to check heights thereof. The feature amount conversion unit 107 previously holds the conversion table as a table, and uses the table to obtain the distance L from the size D of the head.

FIG. 10B is a cross-sectional view focusing on a vertical line passing through the center of the head of the human figure and a plane passing through the capturing focal point of the surveillance camera. A point O is a focal point of the surveillance camera, and straight lines $OS_1$ and $OS_2$ are cross sections of planes indicating an upper end and a lower end of the angle of view of the surveillance camera. A height h is the height of the capturing focal point of the surveillance camera. An angle 4 is an angle of the center of the angle of view with respect to a line perpendicular to the ground. The height h, the angle $\xi$, and an angle $\Theta$ between the straight lines $OS_1$ and $OS_2$ are determined by the installation of the surveillance camera, and are known by information on the imaging environment held by the imaging environment management unit 105.

A point P is the position of the parietal of the human figure. A length of a line segment OP is the distance L previously obtained. A point Q' is an actual position of the body center. Out of planes perpendicular to the straight line extending from the point O to the direction of the center of the angle of view, a plane passing through the point P is a plane K, and a foot of a straight line extending from the point O to the direction of the center of the angle of view in the plane K is H. The 2D video (FIG. 10A) is considered to be a projected image on the plane K. A straight line OH is perpendicular to a straight line $R_1R_2$, and magnitudes of the angle $OR_1H$ and the angle $OR_2H$ are the same as each other. A point Q is a projected point of the point Q' of the body center on the plane K. An intersection of the plane K and the straight line $OS_1$ is a point $R_1$, and an intersection of the plane K and the straight line $OS_2$ is a point $R_2$.

A line segment PQ, a line segment $PR_1$, and a line segment $QR_2$ correspond to perpendicular lines passing through the center of the head in the 2D video (FIG. 10A). If lengths of PQ, $PR_1$, and $QR_2$ are Ga, Gb, and Gc, respectively, the ratio Ga:Gb:Gc is equal to A:B:C. Under this condition, an angle $POR_1=\varphi$ and an angle $QOR_2=\Psi$ are obtained.

If the length of the line OH is L', the lengths Ga, Gb, and Gc can be expressed as follows.

$$Ga = L'\tan\left(\frac{\Theta}{2} - \varphi\right) + L'\tan\left(\frac{\Theta}{2} - \Psi\right)$$

$$Gb = L'\tan\left(\frac{\Theta}{2}\right) - L'\tan\left(\frac{\Theta}{2} - \varphi\right)$$

$$Gc = L'\tan\left(\frac{\Theta}{2}\right) - L'\tan\left(\frac{\Theta}{2} - \Psi\right)$$

When Ga, Gb, Gc, and the above condition of the ratio Ga:Gb:Gc=A:B:C are simultaneously solved, the angles $\varphi$ and $\Psi$ can be obtained as follows. Here, Arctan is a branch of an inverse tangent function in which the range is limited to $(-\pi, \pi)$.

$$\varphi = \frac{\Theta}{2} - \text{Arctan}\left(\frac{A-B+C}{A+B+C}\tan\frac{\Theta}{2}\right)$$

$$\Psi = \frac{\Theta}{2} - \text{Arctan}\left(\frac{A+B-C}{A+B+C}\tan\frac{\Theta}{2}\right)$$

With these formulas, an angle $\xi$ of OP with respect to the perpendicular line to the ground can be obtained as $\xi = \Xi + \Theta/2 - \varphi$.

Next, the feature amount conversion unit 107 estimates the horizontal angle. FIG. 10C is a diagram for describing a method of determining a horizontal angle between the parietal and the surveillance camera in the same 2D video as in FIG. 10A.

An angle $\omega$ between the parietal and the front of the angle of view is obtained. A horizontal angle of view $\Omega$ is known by the setting of the surveillance camera. A length in the 2D video from the parietal to the near left or right end is E, and a length in the 2D video from the parietal to the front of the angle of view (vertical straight line that equally divides the 2D video) is F.

At this time, the angle ω with respect to the center of the parietal is obtained as follows.

$$\omega = \mathrm{Arctan}\left(\frac{F}{E+F}\tan\frac{\Omega}{2}\right)$$

As described above, the distance L of the human figure with respect to the capturing focal point O of the surveillance camera, the vertical angle ξ, and the horizontal angle ω are determined, and the position of (the parietal of) the human figure with respect to the surveillance camera on a 3D space is determined. By using these values, the feature amount conversion unit 107 can estimate the 3D position of the attitude.

In step S306, the image capturing unit 101 converts the video under capturing into electronic data of a still image to create a current frame image. The flowchart in step S306 and subsequent steps represents processing performed by the information processing system every time one frame of the video is input from the image capturing unit 101. The information processing system may execute the subsequent processing, for example, every 10 frames, not every frame, and may discard the remaining nine frames, or may change processing in accordance with a processing load. In particular, frequency of processing may be increased after the learning-finished flag is set and processing of step S310 and processing of step S315 and subsequent steps become unnecessary.

In step S307, the feature amount extraction unit 102 detects, from the image, the human figure of which the feature amount is to be detected. The human figure is detected using known general object detection such as Faster-RCNN, for example.

In step S308, the feature amount extraction unit 102 extracts the feature amount of each human figure detected in step S307.

In step S309, the model learning unit 104 determines whether a conversion unnecessary flag that is set in step S317 described later has been set. If the conversion unnecessary flag has not been set yet, the model learning unit 104 proceeds to step S310, and if the conversion unnecessary flag has already been set, the model learning unit 104 skips step S310 and proceeds to step S311.

In step S310, the model learning unit 104 converts each feature amount extracted in step S308 in accordance with the conversion method determined in step S305. This conversion provides the feature amount of attitude viewed from the imaging environment of the reference camera, allowing recognition by the model of the reference camera. The model learning unit 104 also holds the feature amount as extracted in step S308, which is used in the following steps, separately from the converted feature amount.

In step S311, the recognition unit 103 recognizes the feature amount extracted in step S308 or the feature amount converted in step S310 by using the model held by the recognition unit 103 to detect whether abnormal or not. The feature amount and the model to use differ depending on the state of the learning-finished flag by following the flowchart.

That is, if the learning-finished flag is not set, the recognition unit 103 recognizes the feature amount converted in step S310 (feature amount converted to the imaging environment of the reference camera) by using the model of the reference camera acquired and held in step S304. On the other hand, if the learning-finished flag is set, the recognition unit 103 recognizes the feature amount itself extracted in step S308 by using the model created by the model learning unit 104 and held in step S317 described later. That is, the feature amount and the model in the imaging environment of the new surveillance camera are used.

Anyway, the recognition is performed by calculating the score S (x; M) of the feature amount x and the model M. If the score is smaller than a predetermined threshold, for example 0.7, the feature amount is detected as "abnormal", otherwise the feature amount is detected as "normal". The threshold may be changed between using the model of the reference camera and using the model created by the model learning unit 104, or other recognition parameters may be changed.

In step S312, the recognition unit 103 determines whether there is a feature amount detected as abnormal in step S311. If there are one or more feature amounts detected as abnormal, the recognition unit 103 proceeds to step S313, and otherwise, the recognition unit 103 proceeds to step S314.

In step S313, the display processing unit 109 displays abnormality on the display unit.

In step S314, the recognition unit 103 determines whether the learning-finished flag to be set in step S317 described later has been set. If the learning-finished flag has been set, the recognition unit 103 just returns to step S306 and proceeds to the processing of the next video frame. Otherwise, the recognition unit 103 proceeds to step S315 and thereafter enters a procedure for advancing learning of the model under learning.

In step S315, the update timing determination unit 112 determines whether the progress of learning of the model under learning has reached a predetermined reference value or more. The update timing determination unit 112 proceeds to step S316 if the progress of learning of the model under learning has reached the predetermined reference value or more, and otherwise proceeds to step S319.

The model evaluation unit 108 evaluates the model under learning, compares recognition accuracy p thereof with a predetermined target recognition accuracy P to extract the degree of progress, and determines the progress of learning of the model depending on the value. The model evaluation unit 108 determines the degree of progress by (1−p)/(1−P). For example, if p=80% and P=95%, the degree of progress is 25%. If the degree of progress reaches a predetermined reference value, for example, 70%, the update timing determination unit 112 determines that the model under learning has progressed to a reliable level, and starts asking the user to confirm a result different from the reference model.

In step S319, which will be described later, in a stage where an initial model has not been created yet, the model evaluation unit 108 determines that the degree of progress is less than a reference value.

In step S316, the recognition unit 103 recognizes the feature amount before conversion extracted in step S308 by using the model under learning in a similar manner to step S311 to detect abnormality. This is performed to check the performance in the model under learning.

In step S317, the recognition unit 103 compares the result of abnormality detection by the reference model performed in step S311 with the result of abnormality detection by the model under learning performed in step 316 to determine whether there is a feature amount that provides different results. If there is a feature amount that provides different results, the recognition unit 103 proceeds to step S318 and then proceeds to step S319, otherwise just proceeds to step S319.

In step S318, the display processing unit 109 presents a display for requesting confirmation from the user as shown in the confirmation dialog 208, for data of the feature amount determined to be different from the reference model in step S317. The information to present includes the video from which the object feature amount is derived, and information indicating how the two results do not match. The user makes a determination based on the presented information, and inputs via the input unit whether the feature amount is actually "normal" or "abnormal". The manipulation unit 110 stores the input "normal" or "abnormal" information in the storage unit 11 via the storage processing unit 106. When display and storage of all of the feature amounts determined to be different from the reference model in step S317 are completed, the recognition unit 103 proceeds to step S318.

In this case, confirmation is made on the feature amount that differs depending on whether the final recognition result is "normal" or "abnormal", but the present embodiment is not limited to this case. For example, confirmation may be requested when the difference in the score is large, or when the score is extremely small, or when one or both of the results indicate abnormality regardless of the score. The behavior may be changed depending on the progress of learning determined in step S315.

In step S319, the model learning unit 104 performs additional learning of the model by using each feature amount extracted in step S308. By expectation-maximization (EM) algorithm, the model learning unit 104 performs additional learning on the model under learning by using the feature amount obtained by adding the feature amount additionally determined to be "normal" by the user when step S318 is performed to the feature amount with the detection result in step S311 "normal" and removing the feature amount determined to be "abnormal". Here, the feature amount to be used for additional learning is the feature amount extracted in step S308 as it is, and not the feature amount converted in step S310.

The model learning unit 104 accumulates the feature amount at the beginning of learning, for example, when 1000 feature amounts are collected, the model learning unit 104 determines an average and variance-covariance matrix to create a Gaussian distribution as an initial model, and performs additional learning thereafter.

The model learning unit 104 may not learn the feature amount of which the detection result in step S311 is "normal", but may learn, for example, only the feature amount with the value of score S (x; M), for example, larger than 0.75. By thereby limiting the learning object to the feature amount that has a higher possibility of being normal, it is possible to avoid the mixture of errors, but there is also a possibility that there is not enough identification boundary data.

In step S320, the update timing determination unit 112 determines whether learning of the model learning unit 104 is completed. In a similar manner to step S315, the update timing determination unit 112 evaluates the model after learning by the model evaluation unit 108, and determines that learning is completed when the progress is 100%. On determination that learning is completed, the update timing determination unit 112 proceeds to step S321, and if not completed, the update timing determination unit 112 returns to step S306.

The update timing determination unit 112 may determine the completion of learning not by accuracy but by convergence of learning. For example, the update timing determination unit 112 may calculate and compare the log likelihood of the added feature amounts in the models before and after learning in step S319, and determines that convergence is achieved and learning is completed if an absolute value of the difference is less than 0.01, for example.

In step S321, the display processing unit 109 presents the user that learning of the model under learning is completed in the display unit like the update confirmation dialog 210. Then, the display processing unit 109 confirms with the user whether the model may be exchanged. The user makes a determination based on the presented information, and inputs one of "exchange", "continue learning" and "stop" via the input unit. The manipulation unit 110 receives the input information.

In step S322, based on the information input by the user, if the input information is "exchange", the model update unit 111 proceeds to step S323, and otherwise, the model update unit 111 returns to step S306. If the input information is "continue learning", the model update unit 111 just returns and continues learning, but if the input information is "stop", the model update unit 111 sets only the learning-finished flag and then returns. As a result, in the subsequent processing of the flowchart, learning of the model under learning does not progress, and the reference model will continue to be used.

In step S323, the model update unit 111 sets both the learning-finished flag and the conversion unnecessary flag, and updates the model held by the recognition unit 103 to the model of which learning is completed in step S315.

Thus, after step S323 is performed, it is determined in step S309 that conversion is unnecessary, and it is determined in step S314 that learning is finished. Therefore, steps S310 and S315 to S317 are not performed. That is, the information processing system performs recognition by using the feature amount obtained in the imaging environment of the newly installed surveillance camera as it is, instead of the feature amount converted to the reference environment in step S311, and by using the model learned in the imaging environment of the newly installed surveillance camera in step S315.

With the processing of the first embodiment, after learning of the model is complete, the information processing system can perform recognition using the feature amount and the model of the imaging environment of the newly installed surveillance camera without converting the feature amount, allowing avoidance of a calculation load and the possibility of accuracy degradation associated with feature amount conversion.

In the first embodiment, the information processing system determines the progress of learning based on the evaluation of the model under learning, and updates the model at timing at which the model performance is evaluated to be sufficiently high. However, a method of determining the timing of model update is not limited to this method. The information processing system may update the model after learning a certain number or more of feature amounts, for example, 10000, or may update the model one week after the start of learning. Alternatively, the information processing system may detect the environment fluctuation such as lighting fluctuation of the surveillance object place, and update the model after, for example, one week elapses with the environment fluctuation being small. These conditions may be combined, or the combination may be determined by user input.

Second Embodiment

The first embodiment has described the method of changing an attitude feature amount of the human body by rotation based on the attitude of the surveillance camera. However, depending on the detailed difference in the imaging environment, simple feature amount conversion may not be sufficient, and it may be necessary to bring the feature amount closer to the reference environment by video processing.

The second embodiment will describe a system that uses a face image to detect an "abnormal" human figure, that is, an unregistered outsider. The second embodiment will describe parts that are added to or changed from the first embodiment, and descriptions of common parts are omitted.

FIG. 11 is a diagram for describing image conversion performed in the second embodiment and a feature amount.

An image capturing unit 101 captures a video such as a video 601, and when a human face 602 is detected, the image capturing unit 101 clips a face portion as a face image 603. Since a surveillance camera of the image capturing unit 101 is installed at an angle of view looking down from above, the face of the face image 603 is slightly downward, and is shaded like shade 604 depending on lighting conditions.

In the second embodiment, an information processing system normalizes such a face image 603 in the front direction like a face image 605. The information processing system detects face parts such as an eye or mouth from the normalized face image 605, detects feature points 606 from end points thereof, and creates a feature point set 607. The information processing system defines the feature point set 607 as a feature amount and compares this feature amount with a model of a feature amount created similarly from the front face of a human figure registered in advance, thereby determining whether the face image 603 is the face of the registered human figure.

Meanwhile, the information processing system similarly detects feature points 608 from the face image 603 before normalization, and creates a feature point set 609 from the camera viewpoint. By using a result of identifying the human figure using the normalized feature point set 607, the information processing system collects the feature point set 609 of the same human figure from the camera viewpoint to create a model, thereby enabling recognition from the face image 603 as it is.

In the second embodiment, since the information processing system creates models for respective human figures, it is not efficient to create each model from scratch. Therefore, the information processing system uses a dictionary of feature amounts created by other surveillance cameras. That is, the information processing system creates a new model by performing additional learning on the basis of models created by other surveillance cameras. When there is a plurality of surveillance cameras in a similar imaging environment, the information processing system learns a plurality of model candidates by using each camera as a base model, selects one with good evaluation, thereby selecting a base model suitable for recognition.

Figure 12:
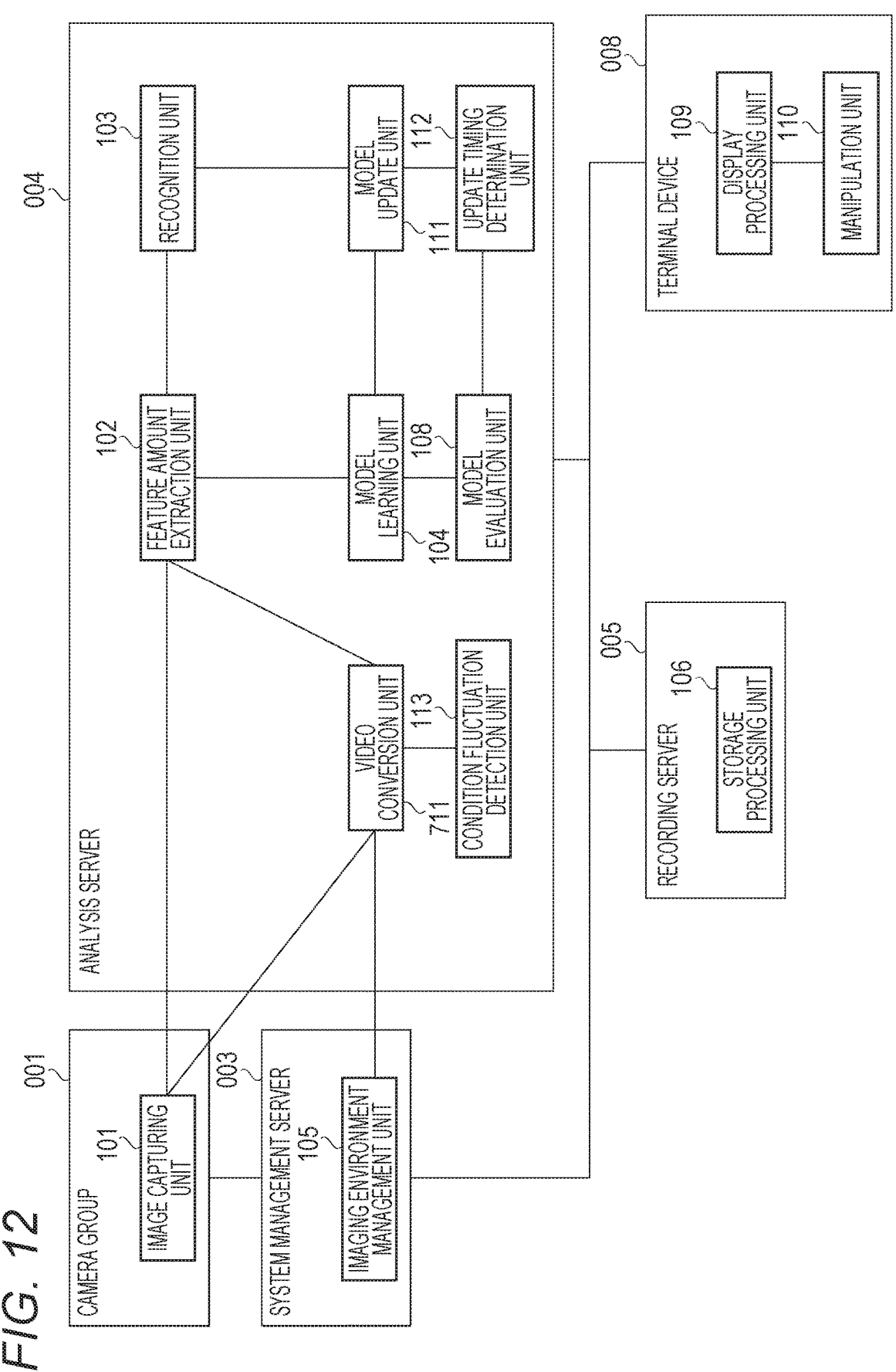
FIG. 12 is a diagram showing one example of a functional configuration of an information processing system of the second embodiment.

FIG. 12 is a diagram showing one example of a functional configuration of the information processing system of the second embodiment. As compared with the functional configuration of FIG. 5, a video conversion unit 711 is added instead of the feature amount conversion unit 107 in the functional configuration of FIG. 12. A feature amount extraction unit 102 extracts the feature amount by creating the feature point set described above. A recognition unit 103 uses the feature amount to determine whether the feature amount corresponds to a face of a registered human figure. An abnormality is detected by this determination.

The video conversion unit 711 outputs a video obtained by converting the video captured by the image capturing unit 101. In the second embodiment, the video conversion unit 711 estimates and output a face image of a human figure facing the front, by using a known method such as a convolutional neural network (CNN) on a face image of a human figure that is not facing the front. The feature amount extraction unit 102 extracts the feature amount from the video captured by the image capturing unit 101 and the video converted by the video conversion unit 711.

Figure 13:
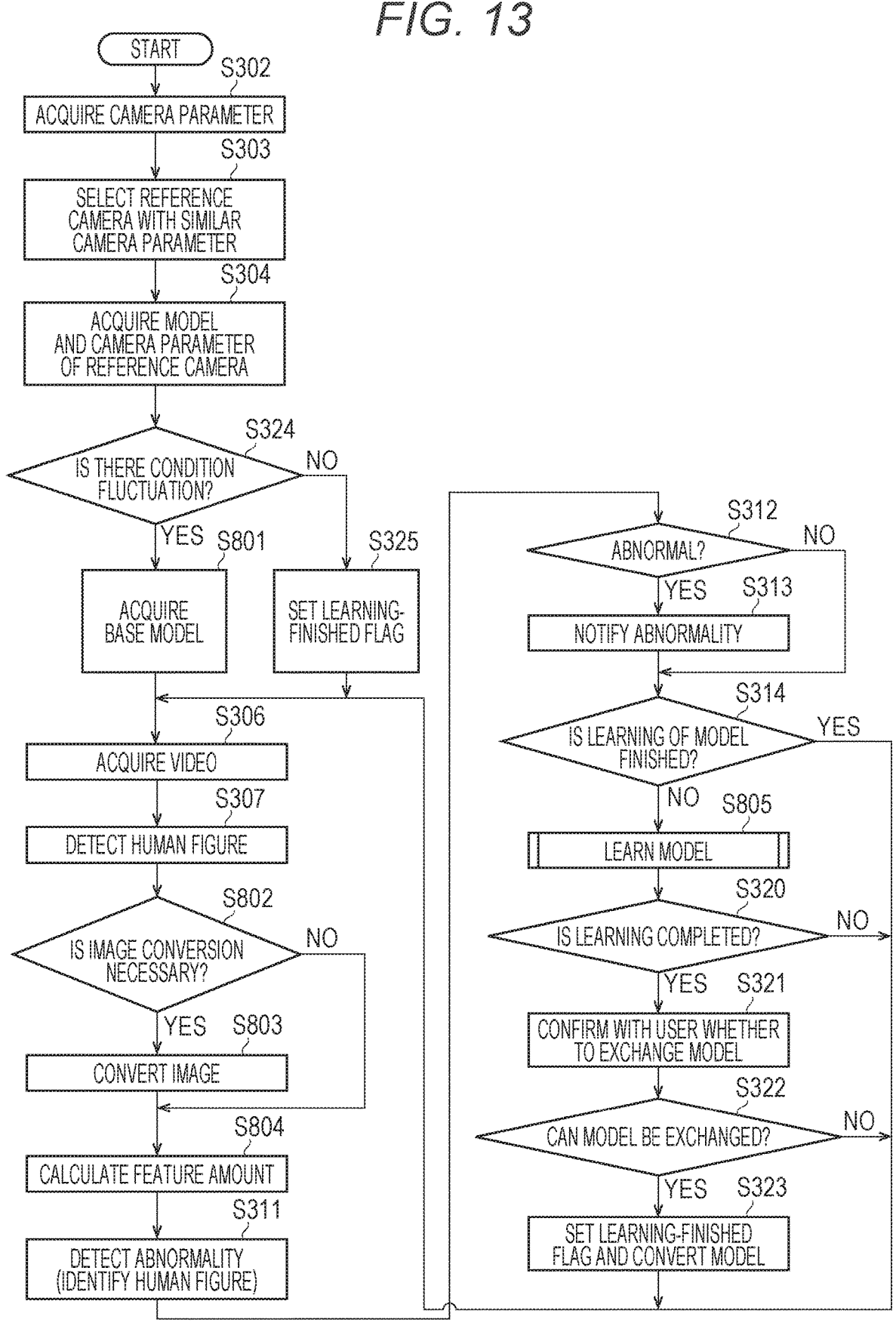
FIG. 13 is a flowchart showing one example of information processing of the second embodiment.

FIG. 13 is a flowchart showing one example of information processing of the second embodiment. In a similar manner to the flowchart of FIG. 8, the flowchart of FIG. 13 represents processing to be performed by the information processing system when a newly installed surveillance camera is added or when a camera environment changes and a reset manipulation is performed.

The processing from start to step S324 of the flowchart of the second embodiment is similar to the processing of FIG. 8. However, a model of a reference camera acquired by an imaging environment management unit 105 in step S304 is the Gaussian mixture distribution model provided for each registered human figure. In step S324, a condition fluctuation detection unit 113 is an acquisition unit, and acquires the imaging environment in which the image capturing unit 101 captures videos. The imaging environment includes lighting conditions in addition to the depression angle and height of the surveillance camera. In addition to the depression angle and height of the surveillance camera, the condition fluctuation detection unit 113 also determines whether there is a fluctuation in the illumination condition. The condition fluctuation detection unit 113 calculates a color temperature of a background image captured by each surveillance camera, and determines that there is a fluctuation in the illumination condition if a difference in the color temperature is, for example, 1000 K or more. On determination in step S324 that there is a fluctuation in the condition, the condition fluctuation detection unit 113 proceeds to step S801.

In step S801, a model learning unit 104 acquires the camera environment managed by the imaging environment management unit 105, and acquires the model corresponding to the surveillance camera in a similar environment as the base model. In step S805 described later, the model learning unit 104 performs learning using the base model acquired here as an initial model. If there is a plurality of surveillance cameras in similar environments, the model learning unit 104 also acquires a plurality of base models.

Following step S307, the processing of step S802 is performed. In step S802, the model learning unit 104 determines whether a conversion unnecessary flag has been set. If the conversion unnecessary flag has not been set, the model learning unit 104 proceeds to step S803 and then proceeds to step S804, otherwise just proceeds to step S804.

In step S803, the video conversion unit 711 converts the image of the head of the human figure detected in step S307, and normalizes the image in the front direction.

In step S804, the feature amount extraction unit 102 extracts the feature amount from the face image. If the face image is not converted in step S803, the feature amount extraction unit 102 extracts the feature amount from the image of the head of the human figure detected in step S307. If the face image is converted in step S803, the feature amount extraction unit 102 extracts the feature amount from the image converted in step S803.

Next, in step S311, in the second embodiment, the recognition unit 103 identifies the human figure using the feature amount extracted in step S804, and determines whether the human figure has been registered. Then, the recognition unit 103 holds a result that the human figure is an "abnormal" human figure if the human figure has not been registered.

In step S314, if a model learning-finished flag has not been set, the recognition unit 103 proceeds to step S805.

In step S805, the model learning unit 104 performs model learning. A method of learning will be described with reference to FIG. 14.

Figure 14:
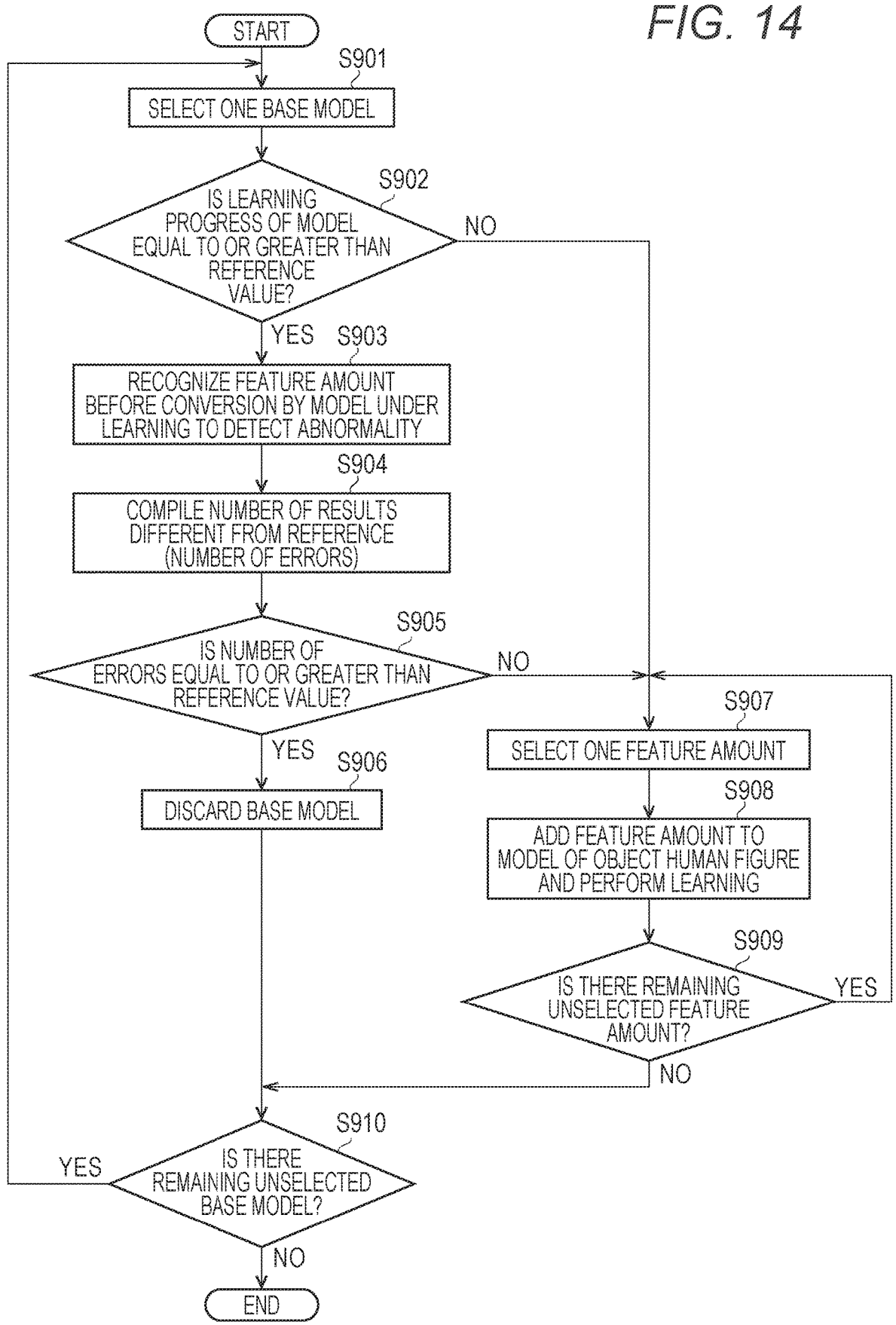
FIG. 14 is a flowchart showing one example of information processing when learning a model under learning.

FIG. 14 is a flowchart showing one example of information processing when learning the model under learning in step S805.

In step S901, the model learning unit 104 selects one from a plurality of base models under learning (model candidates). The order of selection is not important here.

In step S902, the model learning unit 104 determines, in a similar manner to step S315, whether the progress of learning of the selected base model has reached a predetermined reference value or more. If the progress of learning of the selected base model has reached the predetermined reference value or more, the model learning unit 104 proceeds to step S903 to check the accuracy. If the progress has not reached the predetermined reference value or more, the model learning unit 104 proceeds to step S907 to continue learning of the feature amount.

As an exception, if there is only one base model under learning, in order to continue learning of the learning model regardless of accuracy, the model learning unit 104 proceeds to step S907 even if the progress of learning has reached the predetermined reference value or more. In addition to a case where there is originally only one surveillance camera in the similar environment, this case also occurs when the base model is discarded by the processing of step S906 described later and only one is left.

In step S903, the recognition unit 103 recognizes the feature amount extracted from the image before conversion for the human figure detected in step S307 by using the model under learning in a similar manner to step S311 to detect an abnormality. In a similar manner to step S316, the processing of step S903 is performed to confirm the performance of the model under learning.

In step S904, the model learning unit 104 compares a result of abnormality detection by the reference model performed in step S311 with a result of abnormality detection by the model under learning performed in step S903. The model learning unit 104 then sums up and compiles the number of feature amounts from which different results are obtained.

In step S905, the model learning unit 104 determines whether the number of errors compiled in step S904 exceeds a reference value, for example, 100. If the number of errors compiled in step S904 exceeds the reference value, the model learning unit 104 proceeds to step S906, otherwise the model learning unit 104 proceeds to step S907.

In step S906, the model learning unit 104 discards the current base model assuming that the accuracy is unlikely to reach the reference value, and removes the current base model from the base models. Then, the model learning unit 104 proceeds to step S910.

In step S907, the model learning unit 104 selects one unselected feature amount. The order of selection is not important here.

In step S908, the model learning unit 104 adds the feature amount selected in step S907 to the model as a human figure identified with the feature amount in step S311 and performs learning. If the human figure is "abnormal", the model learning unit 104 does not perform learning. However, the model learning unit 104 may learn the model of the "abnormal" human figure, or may newly learn the model as a new human figure.

In step S909, the model learning unit 104 determines whether there is a feature amount that has not been selected yet in step S907. If there is a feature amount that has not been selected in step S907, the model learning unit 104 returns to step S907 to repeat the processing, and if selection of all the feature amounts is completed, the model learning unit 104 proceeds to step S910.

In step S910, the model learning unit 104 determines whether there is a base model that has not been selected yet in step S901. If there is a base model that has not been selected yet in step S901, the model learning unit 104 returns to step S901 to repeat the processing. If all of the base models have been selected, the model learning unit 104 ends the processing of the flowchart of FIG. 14.

With the processing of the second embodiment, while using the model of the reference environment by the video processing, after learning of the model of the newly installed surveillance camera is completed, the information processing system can perform recognition using the feature amount and model of the imaging environment of the newly installed surveillance camera without performing video processing. Also, the information processing system can select and use the most effective base model in model learning from a plurality of camera environments.

Third Embodiment

The first and second embodiments have described methods of dealing with a domain change resulting from the imaging environment of the surveillance camera. However, the domain may change based on conditions of a subject that frequently appears.

The third embodiment will describe an information processing system that adapts to subject's conditions by a method of detecting an unregistered outsider by using gait analysis.

The third embodiment will describe parts that are added to or changed from the second embodiment, and descriptions of common parts are omitted.

An installation state and a purpose of the information processing system of the third embodiment will be described. An installation place is a building divided into a plurality of sections, and entrance control is performed for each section. Several surveillance cameras are installed in each section, determine by gait analysis whether a human figure in a captured video is a registered human figure, and notify an abnormality when detecting an unregistered human figure.

The human figure in each section wears a different uniform in each section and has a different video feature. In a case of a different uniform, for example, due to the influence of a difference in a hem length or the like, there is a possibility that even the same human figure may appear with the feature of gait having biased distribution. Therefore, when it is necessary to refer to a surveillance camera of an environment with a different uniform of a human figure that appears, the difference in distribution is absorbed by converting the clothes of the human image into the uniform of the reference environment.

Figure 15:
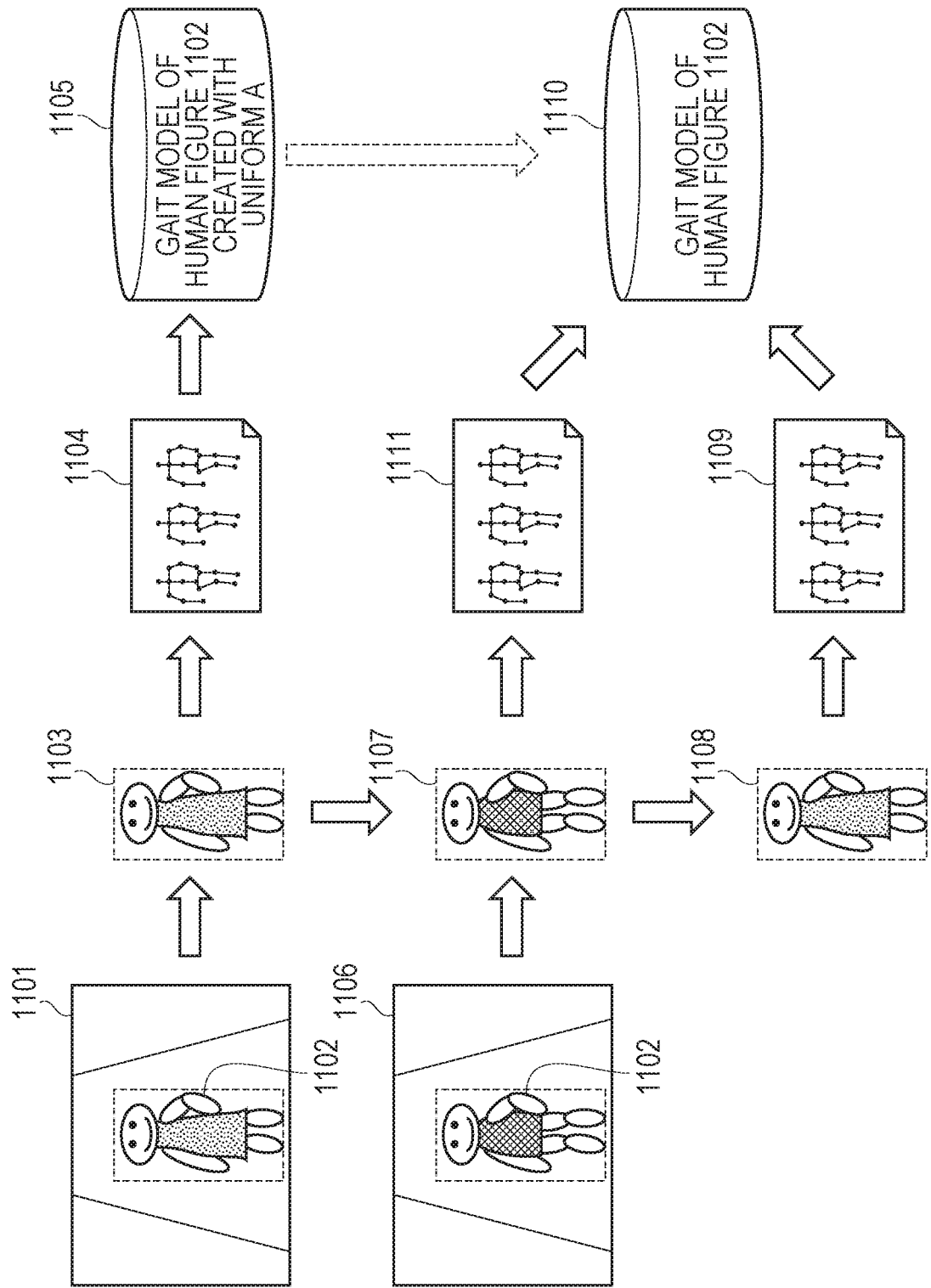
FIG. 15 is a diagram for describing image conversion performed in a third embodiment and a feature amount.

FIG. 15 is a diagram for describing image conversion performed in the third embodiment and the feature amount.

The image capturing unit 101 captures a video 1101 with the surveillance camera of a section A. When a human FIG. 1102 wearing a uniform A in the section A is detected, the information processing system cuts out a part of the human figure as a human image 1103, groups the cut image, and extracts a gait feature amount 1104. Then, the information processing system learns a model 1105 of the human FIG. 1102, and uses the model 1105 for the determination of the human FIG. 1102 after the learning is completed.

Here, it is assumed that the arrangement of the human FIG. 1102 changes, and the human FIG. 1102 moves to a section B and wears a different uniform B. The image capturing unit 101 captures a video 1106 with the surveillance camera of the section B. Then, the information processing system wants to perform gait analysis similarly. Therefore, the information processing system obtains the model 1105 from the surveillance camera of the section A holding the model of the human FIG. 1102, but there is a possibility that the distribution of gait changes due to the change in the uniform.

Therefore, the information processing system obtains a copy of the model 1105 from the surveillance camera of the section A to create a model 1110 for the section B surveillance camera. In the section B, the information processing system performs image conversion on the cut human image 1107 by using CNN, and generates an image 1108 obtained by converting the video of the human figure wearing the uniform B into the uniform A. Then, the information processing system extracts a gait feature amount 1109 of the surveillance camera of the section B, and performs gait analysis using the model 1110 for the section B surveillance camera.

Meanwhile, the information processing system similarly extracts a gait feature amount 1111 from the human image 1107 before conversion. If a result of gait analysis with the converted gait feature amount 1109 described above is the human FIG. 1102, the information processing system performs additional learning on the gait feature amount 1111 in the model 1110 for the section B surveillance camera. Thus, while causing the model 1110 for the section B surveillance camera to support the uniform B by additional learning, the information processing system detects the uniform A by using the model 1110 for the section B surveillance camera under learning. When learning progresses sufficiently, the information processing system switches to perform gait analysis using the gait feature amount 1111.

The model 1105 obtained from the section A surveillance camera and the initial model 1110 for the section B surveillance camera, which has just been obtained, are gait models and do not directly express the uniform A. However, there is a possibility of an unexpected influence because learning is performed biased toward the uniform A. Therefore, the data of uniform B is added to make the model robust.

In the third embodiment, the information processing system is adapted through additional learning of the reference model instead of exchanging the model from scratch, and uses the model under additional learning and the reference model in parallel. This adaptation is performed automatically without the user's awareness.

The functional configuration of the information processing system according to the third embodiment is similar to the functional configuration of the second embodiment shown in FIG. 12. However, in the third embodiment, a feature amount extraction unit 102 extracts the feature amount suitable for gait analysis, such as frequency of movement of a leg. Then, a recognition unit 103 performs abnormality detection by using the feature amount to determine whether the feature amount is a gait of a registered human figure.

The video conversion unit 711 converts the human figure contained in the video into a human figure having predetermined clothes by using CNN or the like.

Figure 16:
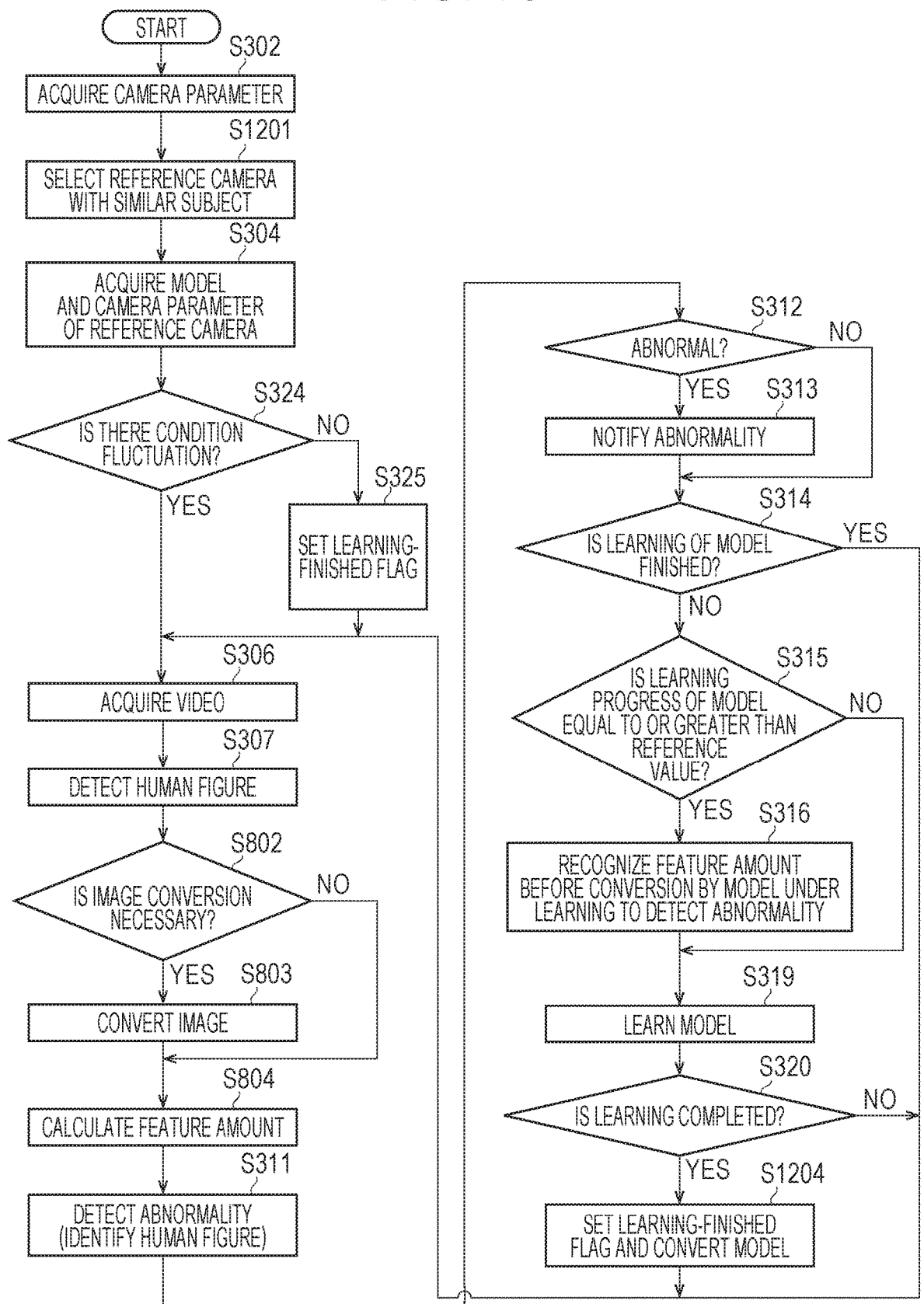
FIG. 16 is a flowchart showing one example of information processing of the third embodiment.

FIG. 16 is a flowchart showing one example of information processing of the third embodiment. In a similar manner to the flowchart of FIG. 13, the flowchart of FIG. 16 represents processing to be performed by the information processing system when a newly installed surveillance camera is added or when the camera environment changes and a reset manipulation is performed.

In the third embodiment, the processing from start to S302 is similar to the processing in FIG. 13. Following step S302, the processing of step S1201 is performed.

In step S1201, a model learning unit 104 estimates clothes of the human figure captured by the image capturing unit 101, and selects the surveillance camera that captures many human figures with similar clothes as the reference camera with priority. If there is no human figure with similar clothes, the model learning unit 104 selects the surveillance camera with a similar camera parameter.

After step S1201, in step S304, an imaging environment management unit 105 acquires the model and the camera parameter of the reference camera.

After step S304, in step S324, a condition fluctuation detection unit 113 determines whether to perform learning on the reference model thereafter. That is, the condition fluctuation detection unit 113 determines whether the surveillance camera that captures many human figures with similar clothes is selected with priority in step S1201. The condition fluctuation detection unit 113 determines to perform learning when the surveillance camera that captures many human figures with similar clothes is not selected with priority. On determination to perform learning, the condition fluctuation detection unit 113 proceeds to step S306, and otherwise, the condition fluctuation detection unit 113 proceeds to step S325. In step S325, the condition fluctuation detection unit 113 sets the learning-finished flag and proceeds to step S306. If learning is not performed, recognition will be performed using the reference model as it is.

In the third embodiment, the condition fluctuation detection unit 113 detects the condition fluctuation based on the clothes of the human figure of the subject as one example of the attribute of the subject. However, the present embodiment is not limited to this example. For example, the condition fluctuation detection unit 113 may detect the condition fluctuation using attributes of the subject such as age, sex, race, or a carried item. The subject is not limited to a human figure. For example, if a vehicle is defined as the subject, a similar method can be used when detecting condition fluctuation depending on whether there are many specified vehicle types.

The processing from steps S306 to S314 in the third embodiment is similar to the processing in FIG. 13. However, in step S803 in the third embodiment, the video conversion unit 711 converts the clothes of the human figure contained in the video in accordance with the clothes worn by the subject of the reference camera.

In step S314 in the third embodiment, on determination that the model is not a learning-finished model, the recognition unit 103 proceeds to step S315 in a similar manner to FIG. 8. Steps from here to step S319 are similar to steps in FIG. 8 except that steps S317 and S318 are omitted. Steps S317 and S318 in the third embodiment are excluded because the model is automatically updated without the user's awareness.

In step S319 in the third embodiment, the model learning unit 104 performs additional learning directly on the model acquired from the reference camera, and progresses the learning sequentially for one model. In the next step S320, on determination that learning is sufficient, an update timing determination unit 112 proceeds to step S1204.

In step S1204, a model update unit 111 sets the learning-finished flag and the conversion unnecessary flag. Unlike step S323, the information processing system of the third embodiment does not exchange models, and performs recognition on the learning-finished model without conversion thereafter.

The processing of the third embodiment allows the model of the reference camera to be gradually adapted to the condition of the subject of the newly installed surveillance camera while using the model of the reference environment. One example of the embodiment of the present invention has been described in detail above, but the present invention is not limited to the specified embodiment.

For example, part or all of the functional configuration described above may be mounted in each device as a hardware configuration.

According to each embodiment described above, the information processing system can quickly start recognition with the new camera by using the model learned in a different domain, and proceed model creation in a new camera domain in parallel.

OTHER EMBODIMENTS

Embodiment(s) can also be realized by a computer of a system or apparatus that reads out and executes computer executable instructions (e.g., one or more programs) recorded on a storage medium (that may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-174814, filed Sep. 19, 2018, which is hereby incorporated by reference herein in its entirety.

What is claimed is:

1. An information processing system comprising:
one or more processors, wherein the one or more processors function as:
a recognition unit configured to perform recognition processing on a video captured by an image capturing unit;
a detection unit configured to detect a fluctuation of a condition that is an object of the recognition processing;
a first extraction unit configured to extract a first feature from the video;
a second extraction unit configured to extract a second feature from the video based on the fluctuation of the condition;
a determination unit configured to determine whether to update a model used for the recognition processing based on the fluctuation of the condition; and
a control unit configured to control, based on the determination by the determination unit, which of the first feature and the second feature is used to perform the recognition processing.

2. The information processing system according to claim 1, wherein the one or more processors further function as an evaluation unit configured to evaluate the model,
wherein the determination unit determines an update timing based on the evaluation.

3. The information processing system according to claim 1, wherein the one or more processors further function as a learning unit configured to create a new model based on a result of the recognition processing,
wherein in a case where the model for the recognition processing is determined to be updated, the determination unit updates the model by switching to the new model created by the learning unit.

4. The information processing system according to claim 3, wherein
the learning unit performs additional learning on the model to create the new model.

5. The information processing system according to claim 1, wherein
the detection unit configured to detect the fluctuation of a condition associated with the capturing by the image capturing unit,
wherein the determination unit determines an update timing based on the fluctuation of the condition.

6. The information processing system according to claim 5, wherein the one or more processors further function as an acquisition unit configured to acquire an imaging environment in which the image capturing unit captures the video,
wherein the detection unit detects the fluctuation of the condition based on the imaging environment.

7. The information processing system according to claim 1, wherein
the detection unit detects the fluctuation of the condition based on a subject captured by the image capturing unit.

8. The information processing system according to claim 1, wherein
the detection unit detects the fluctuation of the condition based on an attribute of the object of the recognition processing.

9. The information processing system according to claim 1, wherein the one or more processors further function as a first conversion unit configured to convert the first feature, wherein the second extraction unit extracts the second feature by converting the first feature by the first conversion unit based on the fluctuation of the condition.

10. The information processing system according to claim 1, wherein the one or more processors further function as a second conversion unit configured to convert the video,
wherein the second extraction unit extracts the second feature from the video obtained by converting the video by the second conversion unit based on the fluctuation of the condition.

11. The information processing system according to claim 1, wherein in a case where the model for the recognition processing is determined to be updated, the determination unit selects one model candidate from a plurality of model candidates, and updates the model by the selected one model candidate.

12. The information processing system according to claim 11, wherein in a case where the model for the recognition processing is determined to be updated, the determination unit selects the one model candidate based on a result of performing the recognition processing using each of the plurality of model candidates and a result of performing the recognition processing using the model to be updated.

13. The information processing system according to claim 1, further comprising
a display unit configured to display information regarding an update of the model.

14. The information processing system according to claim 13, wherein
the display unit displays, as the information, information on a progress of learning of a new model.

15. The information processing system according to claim 13, wherein
the display unit displays, as the information, information on a difference between a recognition result by the model and a recognition result by a new model under learning, or information on a difference between the recognition result by the model and a recognition result by a new model of which learning is completed.

16. The information processing system according to claim 15, further comprising
an input unit configured to input which of the recognition result by the model and the recognition result by the new model under learning is correct.

17. An information processing method comprising:
performing recognition processing on a video captured by an image capturing unit;
detecting a fluctuation of a condition that is an object of the recognition processing;
extracting a first feature from the video;
extracting a second feature from the video based on the fluctuation of the condition;
determining whether to update a model used for the recognition processing based on the fluctuation of the condition; and
controlling, based on the determining whether to update the model, which of the first feature and the second feature is used to perform the recognition processing.

18. A non-transitory computer-readable storage medium storing a program for causing a computer to execute an information processing method, the information processing method comprising:
performing recognition processing on a video captured by an image capturing unit;
detecting a fluctuation of a condition that is an object of the recognition processing;
extracting a first feature from the video;
extracting a second feature from the video based on the fluctuation of the condition;
determining whether to update a model used for the recognition processing based on the fluctuation of the condition; and
controlling, based on determining whether to update the model, which of the first feature and the second feature is used to perform the recognition processing.

* * * * *